United States Patent [19]

Bogart et al.

[11] Patent Number: 5,329,582
[45] Date of Patent: Jul. 12, 1994

[54] DYNAMIC TONE-ADMINISTRATION

[75] Inventors: Frank J. Bogart, Boulder; Bruce D. Butterfield, Denver; David L. Chavez, Jr., Northglenn; Henry C. Dittmer, Westminster; Frederick R. Fix, Arvada; Larry J. Hardouin, Westminster; Nancy K. Schmidt, Broomfield; Linda L. Thomson, Westminster, all of Colo.

[73] Assignee: AT&T Bell Laboratories, Murray Hill, N.J.

[21] Appl. No.: 786,324

[22] Filed: Oct. 31, 1991

[51] Int. Cl.$^5$ ............... H04M 3/42; H04M 11/00; H04M 7/00; G06F 15/38
[52] U.S. Cl. .................... 379/201; 379/94; 379/220; 379/269; 364/274.8; 364/972.1; 395/62
[58] Field of Search ........... 379/91, 112, 201, 207, 379/219, 220, 221, 94, 269; 395/60, 61, 62; 364/274.8, 275.9, 972.1

[56] References Cited

U.S. PATENT DOCUMENTS

| | | | |
|---|---|---|---|
| 4,191,860 | 3/1980 | Weber | 379/211 X |
| 4,256,926 | 3/1981 | Pitroda et al. | 379/269 |
| 4,259,549 | 3/1981 | Stehman | 379/204 |
| 4,314,342 | 2/1982 | McNeir et al. | 364/468 |
| 4,577,066 | 3/1986 | Bimonte et al. | 379/221 |
| 4,600,812 | 7/1986 | Gerlits | 379/221 |
| 4,695,977 | 9/1987 | Hansen et al. | 379/94 |
| 4,706,212 | 11/1987 | Toma | 364/972.1 |
| 4,987,587 | 1/1991 | Jolissaint | 379/94 |
| 5,017,917 | 5/1991 | Fisher et al. | 379/94 |
| 5,021,943 | 6/1991 | Grimes | 364/274.8 |
| 5,187,740 | 2/1993 | Swaim et al. | 379/201 X |

OTHER PUBLICATIONS

"Definity Communications System, Generic 2 and System 85, Feature Descriptions," AT&T Co. document No. 555-104-301 (Aug. 1989) pp. 15-1 to 15-4.
"Definity Communications System, Generic 2, New Capabilities of the Definity Generic 2 Switch", AT&T Co. document No. 555-104-401 (Issue 1, Feb. 1989) pp. 8-177 to 8-244.
"Definity Communications System, Generic 2 and System 85, Feature Descriptions," AT&T Co. document No. 555-104-301 (Aug. 1989) pp. 21-1 to 21-12.
"Notes on the Network", AT&T Co. (1980) Section 2, pp. 1-16, and Section 3, pp. 8-10 and Appendices 1 and 2.
"Notes on Distance Dialing, Section 2, Numbering Plan and Dialing Procedures", AT&T Co. (1975) pp. 1-19.
D. Talley, *Basic Telephone Switching Systems*, 2d. ed., Hayden Book Co., Inc. (1979) pp. 6-8.

Primary Examiner—James L. Dwyer
Assistant Examiner—Harry S. Hong
Attorney, Agent, or Firm—David Volejnicek

[57] ABSTRACT

Tone treatment given to callers by an originating switching system (10) during dialing may be customized in a call-processing arrangement (200) that uses stored definitions of syntax (320, 350) and grammar (400, 410) of the network numbering plan. The syntax definitions include definitions (312) of individual symbol strings and their associated tones (336), if any. Associations of tones with symbol strings are administratively reprogrammable to change the specified tone treatment. Following dialing and identification (340) of an individual symbol string, a caller is immediately fed back (906) the string's associated tone, if any. A caller is thus immediately advised during dialing of successful or unsuccessful input of a valid symbol string, and is selectively prompted for input of another string. Caller-perceivable feedback signals other than tones may be used with equal effect.

18 Claims, 14 Drawing Sheets

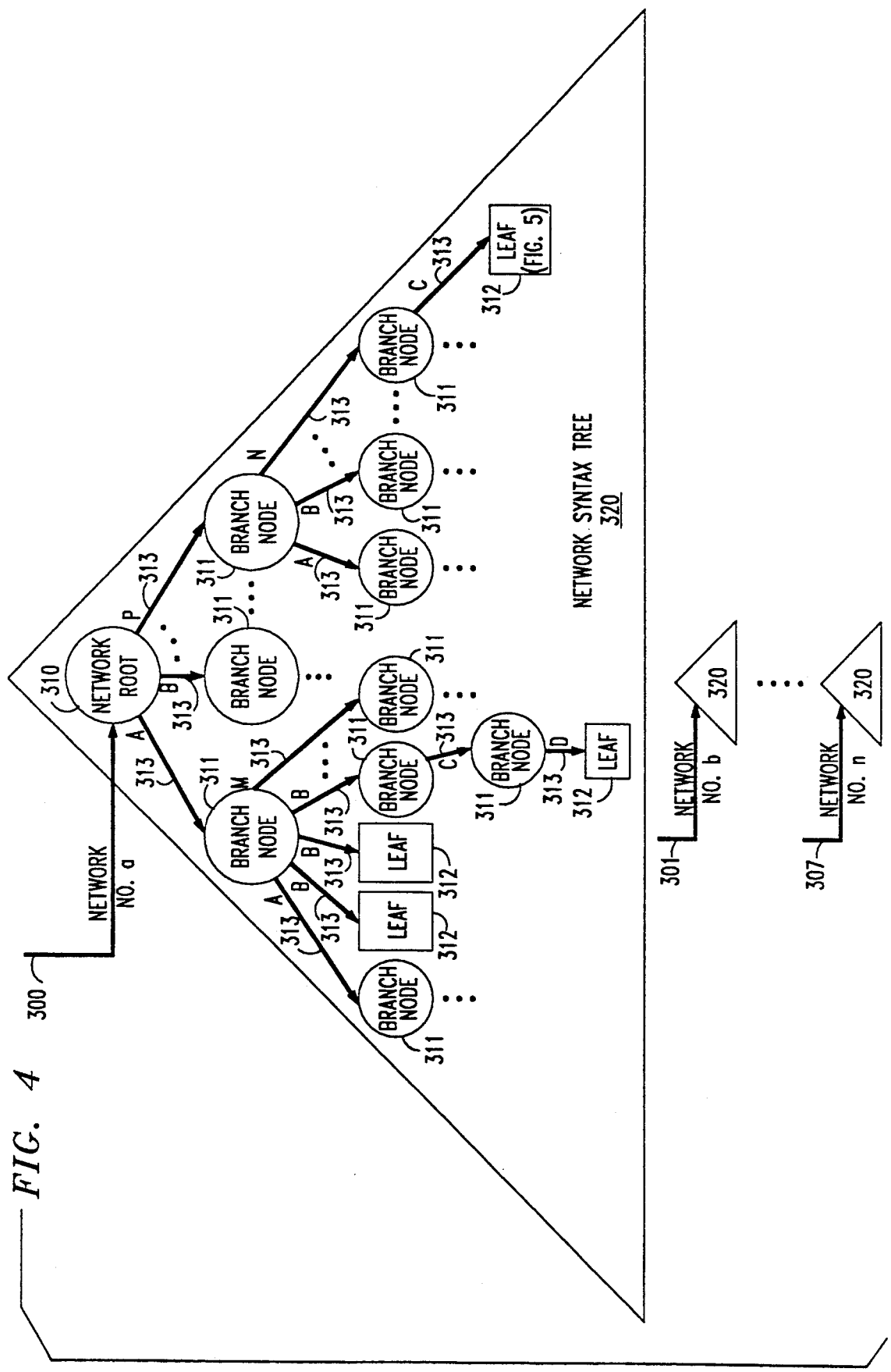

FIG. 8

COMBINE GRAMMAR MATRIX 410

| RETAINED STRING TYPE 413 \ RECEIVED STRING TYPE 414 | ACCOUNT CODE | IXC | TOLL PREFIX | INT'L | OPERATOR ASSIST. | AREA CODE | OFFICE CODE | SUBSCRIBER NUMBER | ... |
|---|---|---|---|---|---|---|---|---|---|
| NONE | | | | | | | | | |
| ACCOUNT CODE | | | | | | | | | |
| IXC | 415 416 | | | | | | | | |
| TOLL PREFIX | | | | | | | | | |
| INT'L | | | | | | | | | |
| OPERATOR ASSIST. | | | | | 415 416 | | | | |
| AREA CODE | | | | | | | | | |
| OFFICE CODE | | | | | | | | 415 416 | |
| SUBSCRIBER NUMBER | | | | | | | | | |
| ... | 412 | 412 | 412 | 412 | 412 | 412 | 412 | 412 | ... |

← 300 NETWORK NO. a

← 301 NETWORK NO. b — 410

← 307 NETWORK NO. n — 410

FIG. 16
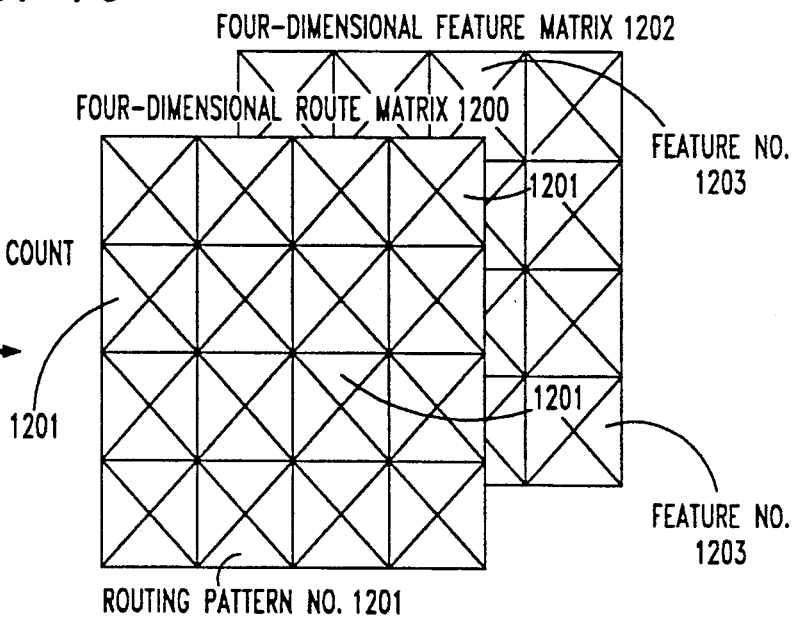
FIG. 17
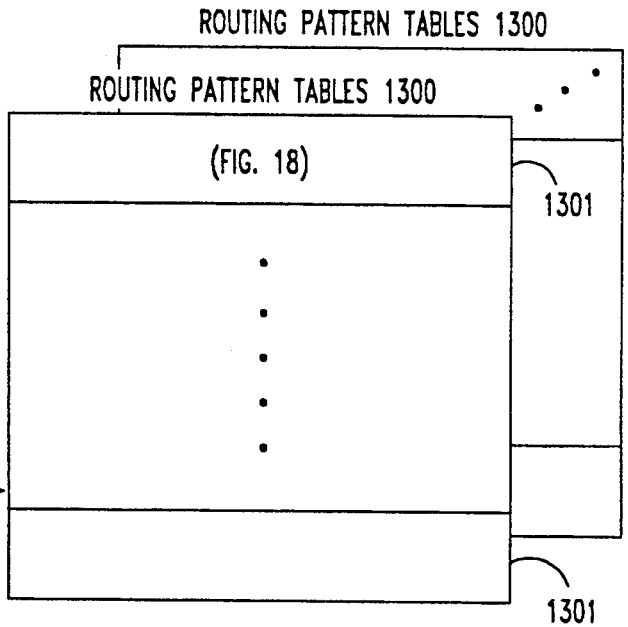
FIG. 18
| PREFERENCE 1301 | |
|---|---|
| TRUNK GROUP NUMBER | 1401 |
| SENDING REQUIREMENTS | 1402 |
| TOLL INFORMATION | 1403 |
| ISDN SENDING FORMAT | 1404 |
| DIGIT MODIFICATION INDEX (DMI) | 1405 |
| DIGIT SENDING INDEX (DSI) | 1406 |

DYNAMIC TONE-ADMINISTRATION

CROSS-REFERENCE TO RELATED APPLICATIONS

F. J. Bogart, B. D. Butterfield, D. L. Chavez, Jr., H. C. Dittmer, F. R. Fix, L. J. Hardouin, N. K. Schmidt, and L. L. Thomson, "Telecommunications Call-Processing Arrangement", Ser. No. 07/786,167;

F. J. Bogart, B. D. Butterfield, D. L. Chavez, Jr., H. C. Dittmer, F. R. Fix, L. J. Hardouin, N. K. Schmidt, and L. L. Thomson, "Dynamic Routing-Administration", Ser. No. 07/786,168;

F. J. Bogart, B. D. Butterfield, D. L. Chavez, Jr., H. C. Dittmer, F. R. Fix, L. J. Hardouin, N. K. Schmidt, and L. L. Thomson, "Dialed Number Recognition Arrangement", Ser. No. 07/786,325;

F. J. Bogart, B. D. Butterfield, D. L. Chavez, Jr., H. C. Dittmer, F. R. Fix, L. J. Hardouin, N. K. Schmidt, and L. L. Thomson, "Use-Code Based Call-Treatment Selection", Ser. No. 07/786,163;

F. J. Bogart, B. D. Butterfield, D. L. Chavez, Jr., H. C. Dittmer, F. R. Fix, L. J. Hardouin, N. K. Schmidt, and L. L. Thomson, "Context-Dependent Call-Feature Selection", Ser. No. 07/786,323;

These applications are tiled concurrently with this application and are assigned to the same assignee.

TECHNICAL FIELD

This invention relates generally to telephone and telephone-like communications systems including integrated services systems, and relates particularly to telephony call-processing arrangements.

BACKGROUND OF THE INVENTION

In telephone or telephone-like communications systems, system tones and ringing are used to inform a system user of the status or progress of a call to which the user is either an actual or an intended party. System tones include dial tone, busy tone, reorder tone, ringing feedback tone, and various prompting tones. Because a switching system is typically a source of these tones, the switching system includes an arrangement for generating these tones and an arrangement for distributing the tones to users' telephone lines. In alternative implementations, such as ISDN, the tones are generated locally at users' terminals in response to messages received by those terminals from the switching system.

Many switching system owners (e.g., private-party owners of PBXs, public-network owners of central office switches) would like to customize tone behavior for numbers in their network numbering plans. However, the way tones are presently handled by switching systems is to hard-code the tone treatment into the call-processing software, such that tones are given only in places where the designer of the switching system believes that tones should be given based on the designer's fixed network-number constructs. Deleting or adding tones, administratively by the customer in places where the customers would like to have them, is typically impossible, because the switching system cannot intelligently handle network-number constructs that do not conform to the structure that was implemented by the system's designer.

In a complex network (e.g., the international direct-dialed network), dialed network numbers can often be quite long. The longer the dialed network number is, the more likely it is that the user will misdial, and hence the more likely it is that network facilities will be needlessly tied up and time will be wasted while the entire number is (mis)dialed and thereafter redialed.

SUMMARY OF THE INVENTION

This invention is directed to solving these and other problems and disadvantages of the prior art. Generally according to the invention, a switching system is provided with an administrable capability to return a tone (used herein to refer to any audio signal) or some other feedback signal (e.g., a visual signal, a voice message, or an alphanumeric message) to a caller at any desired point or points in the dialing of a network number. A network number is any sequence of symbols (e.g., digits) that has a meaning within a network numbering plan that is defined for the switching system. The network number consists of one or more segments of symbols, referred to as strings, each one of which has a defined meaning within the network numbering plan. (For example,, an illustrative set of strings making up a network number in the North American numbering plan comprises: long-distance carrier I.D.; area code; exchange code; extension number. Illustratively, in accordance with the invention, a tone such as dial tone may be provided to the caller following successful dialing of a valid carrier I.D., and another tone such as a multi-frequency "beep" may be provided to the caller following successful dialing of a valid area code.)

Specifically according to the invention, there is provided a call-processing arrangement for a call-originating switching system, and a call-originating switching system that includes such an arrangement, wherein feedback-signals that are to be given to callers while they are inputting call-control symbol-sequences (e.g., dialing digits of network numbers) is programmably specified and is administratively reprogrammable to change the tone treatment. The arrangement and the switching system are for use in a telecommunications network having a network numbering plan and wherein callers supply sequences of symbols to specify treatment to be given to calls, and wherein each sequence comprises at least one symbol string that is defined for the numbering plan of the network. In response to receipt from a caller, who is directly served by the arrangement, of symbols of a call-control symbol-sequence being input by the caller, the arrangement identifies individual ones of the defined symbol strings that are included in the call-control symbol sequence. It then uses stored information that specifies, for each individual one of the defined symbol strings, any caller-perceivable feedback signal that presently corresponds to the individual defined symbol string, to determine the feedback signal that corresponds to the individual included symbol string. This stored information is administrably reprogrammable to change the presently-specified corresponding feedback signals. The arrangement causes the determined feedback signal to be sent to the caller, preferably immediately following the identification of the individual included symbol string. The caller is thus given caller-perceivable feedback signals, such as audible tones, immediately following his or her input of selected ones—and perhaps even each one—of the defined symbol strings of the call-control symbol sequence.

Since the feedback tones are dependent upon the identity of the symbol strings within the sequence (as opposed to the mere numerical values of sequentially-received digits), and since the feedback tones are administratively reprogrammable (as opposed to being hard-coded), switching system owners may customize tone behavior for numbers in their network numbering plans. An administrator may specify whether a feedback signal should be given to a caller—and if so, which one—for any dialed symbol string. Callers can thus be given feedback during their dialing to inform them of successful or unsuccessful input of individual segments of a dialed number and to selectively prompt them for input of further segments. Callers may be guided thereby in their dialing actions. Also, callers are not forced to wait until they have completed all dialing to find out if their dialing was successful or unsuccessful. Rather, they can be advised of a need to redial immediately upon the making of a mistake, thereby saving time and avoiding prolonged fruitless use of system resources.

These and other advantages and features of the invention will become apparent from the following description of an illustrative embodiment of the invention considered together with the drawing.

BRIEF DESCRIPTION OF THE DRAWING

FIGS. 4-6 are block diagrams of syntax-defining data structures of network digit analysis of FIG. 3;

FIGS. 7-8 are block diagrams of grammar-defining data structures of network digit analysis of FIG. 3;

FIGS. 16-18 are block diagrams of data structures of generalized route selection of FIG. 3;

FIG. 22 is a flow diagram of a function of digit sending of FIG. 3.

DETAILED DESCRIPTION

Figure 1:
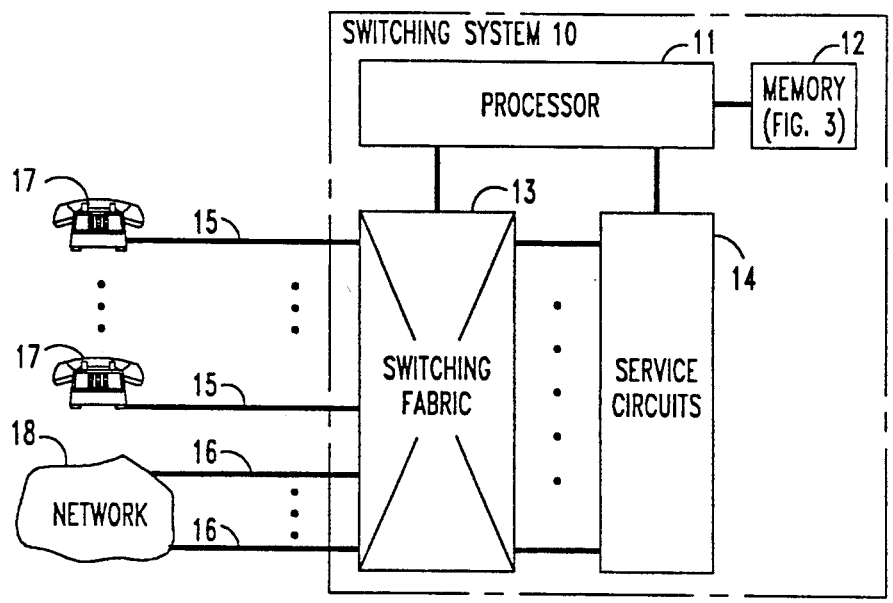
FIG. 1 is a block diagram of a telephone system that incorporates an illustrative embodiment of the invention.

An illustrative embodiment of the invention is implemented in a telecommunications system shown in FIG. 1. The system of FIG. 1 is a telephone system that includes a switching system 10 which provides telephone services to user terminals 17 which are connected to switching system 10 by telephone lines 15. Switching system 10 interconnects terminals 17 with each other and with the remainder of the telephone system, designated in FIG. 1 as network 18, to which the switching system 10 is connected by telephone trunks 16. Network 18 typically comprises one or more other switching systems 10 and user terminals 17.

The telephone system of FIG. 1 implements one or more network numbering plans. Network numbering plans are well known in the art. An illustrative example thereof is the North American network numbering plan of the North American public telephone system. A network numbering plan is a convention that allows users to use symbols (e.g., dialed digits) to define to the network the treatment that they wish a call to receive. The generic characteristics of network numbering plans are graphically illustrated in FIG. 2. As shown, a network numbering plan 100 is composed of a plurality of defined symbol strings 101-150. Each defined symbol string consists of one or more symbols, and has a defined meaning. Illustrative examples of symbol strings are: area codes, office codes, extension numbers, long distance carrier codes, and feature specification codes. The defined symbol strings are building blocks from which symbol sequences 151-199—e.g., network numbers, dialed numbers—are constructed. Each valid symbol sequence consists of one or more defined symbol strings, and has a meaning within the network numbering plan. A symbol sequence defines the treatment that a corresponding call is to receive. If a symbol sequence is valid (i.e., does not violate the definitions of its constituent symbol strings and their permissible contexts) it is said to be included in the network numbering plan.

Conventionally in a network such as that shown in FIG. 1, a switching system such as system 10 would understand only one numbering plan, which is used in the portion of the system of FIG. 1 that it is a part of. The switching system would transport signals pertaining to other numbering plans, used in other portions of the system of FIG. 1, to those portions for their use through communication paths that it would establish on the basis of its own numbering plan.

Switching system 10 is a stored-program controlled system, such as the AT&T Definity® G2 PBX. It comprises a conventional switching fabric 13, a processor 11 for controlling the operation of fabric 13, and a memory 12 for storing programs for execution and data for use by processor 11 in performing its control functions. It further comprises conventional service circuits 14—such as dialed-digit collection registers, outpulsing circuits, tone generators, etc.—also operating under control of processor 11 and connected to fabric 13 for use in setting up call connections and providing call features and other telecommunications services to user terminals 17.

Figure 3:
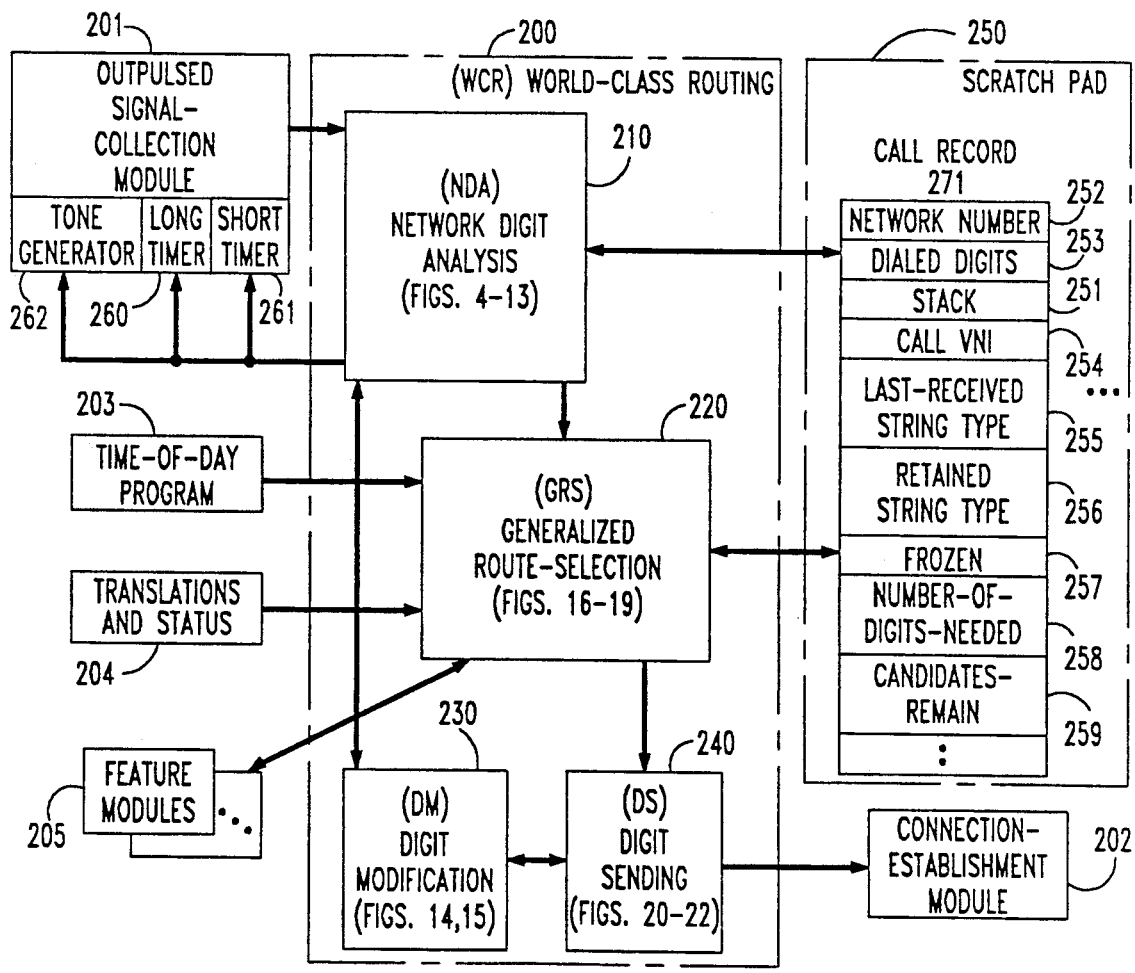
FIG. 3 is a block diagram of selected contents of the memory of the switching system of the telephone system of FIG. 1.

Contents of memory 12 that are relevant to this discussion are shown in FIG. 3. Most of the programs and data structures held by memory 12 are conventional. These include an outpulsed signal-collection program module 201, a connection-establishment program module 202, a time-of-day program 203, translations and status 204 for, e.g., trunks 16, lines 15, and terminals 17, feature program modules 205, and a scratchpad memory portion 250 for holding call records 271 of individual calls. However, according to the invention, there is provided a new call-processing arrangement, referred to as world-class-routing (WCR) 200, which translates user-provided call-destination addresses or feature-selection codes—digits and other symbols that are received across telephone lines 15 from user terminals 17 or across trunks 16 from other switching systems—into call routes and feature-access connections for establishment by switching fabric 13 and network 18 and provisioning by modules 205 and circuits 14. World-class routing 200 receives, as its input, symbol-representing signals that have been outpulsed at a terminal 17 or at the other end of a trunk 16 and collected by a conventional outpulsed signal-collection module 201. It transforms the received signals into route-identifying, feature-identifying, and other connection-identifying and function-identifying information and into destination-identifying outpulsed digits, and sends these as its output to, e.g., a conventional connection-establishment program 202 or a feature module 205.

World-class-routing 200 implements the concept of a network numbering plan as being a language, in the mathematical/computer science sense. As such, world-class routing 200 defines any network numbering plan in terms of a grammar and a syntax of symbol strings that constitute the network numbering plan, and derives meaning from sequences of symbols received over lines 15 and trunks 16 by parsing those symbol sequences and analyzing the parsed symbol sequences through use of the defined grammar and syntax. Consequently, through the expedient of redefining the grammar and/or the syntax, world-class-routing 200 modifies or redefines the existing numbering plan or adapts to a totally different numbering plan.

Figure 12:
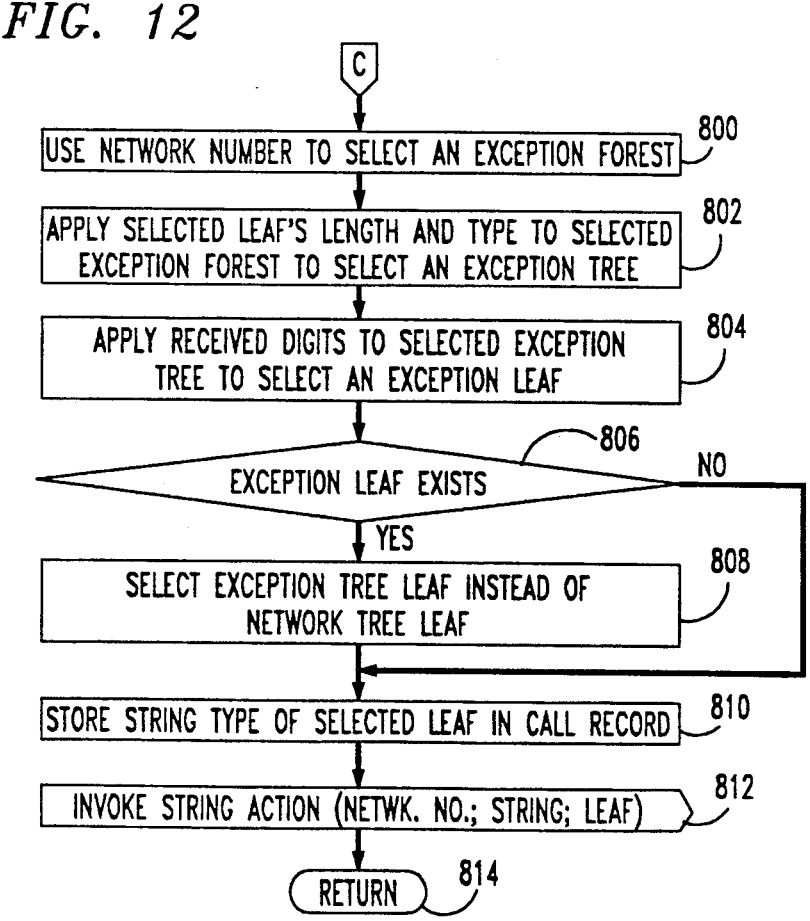
Figure 13:
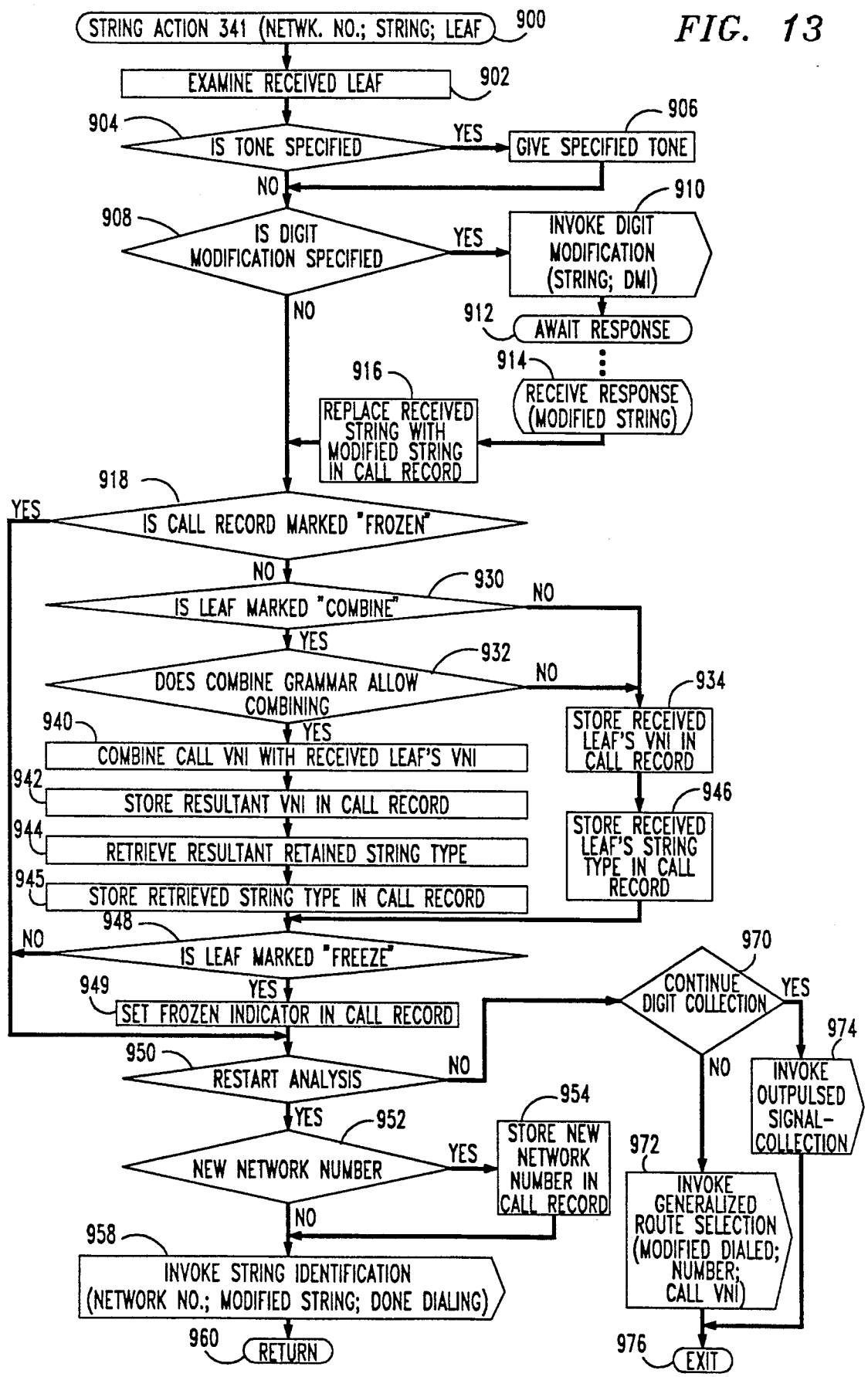
FIG. 13 is a flow diagram of a string action function of network digit analysis of FIG. 3.
Figure 14:
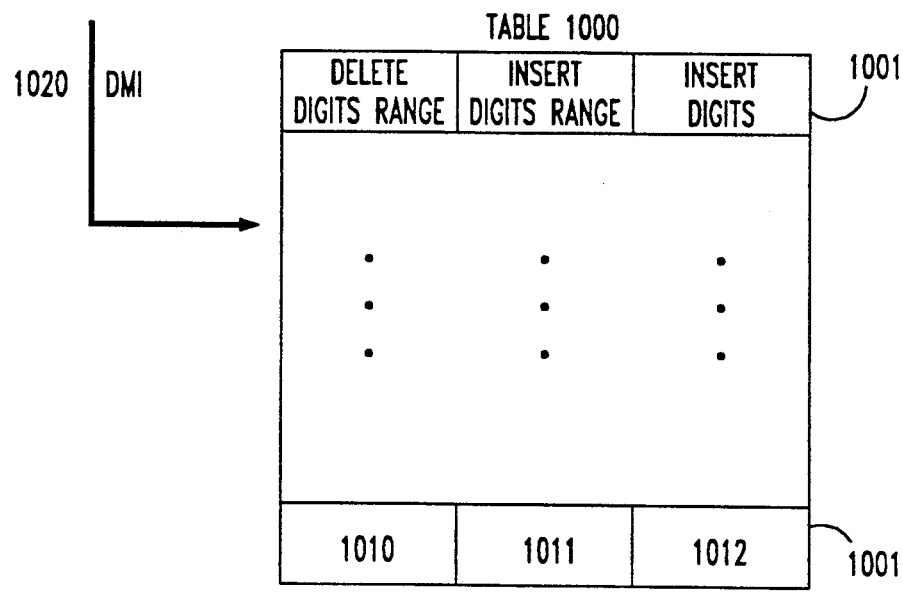
FIG. 14 is a block diagram of a data structure of digit modification of FIG. 3.
Figure 15:
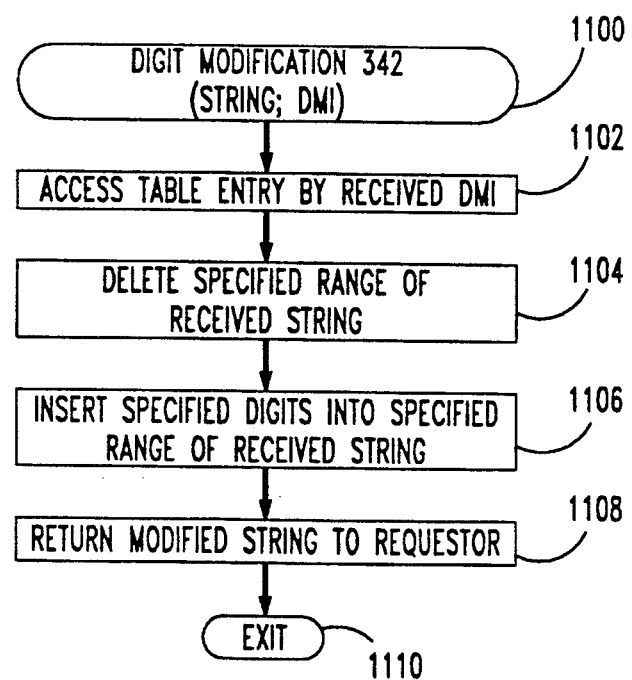
FIG. 15 is a flow diagram of a function of digit modification of FIG. 3.
Figure 19:
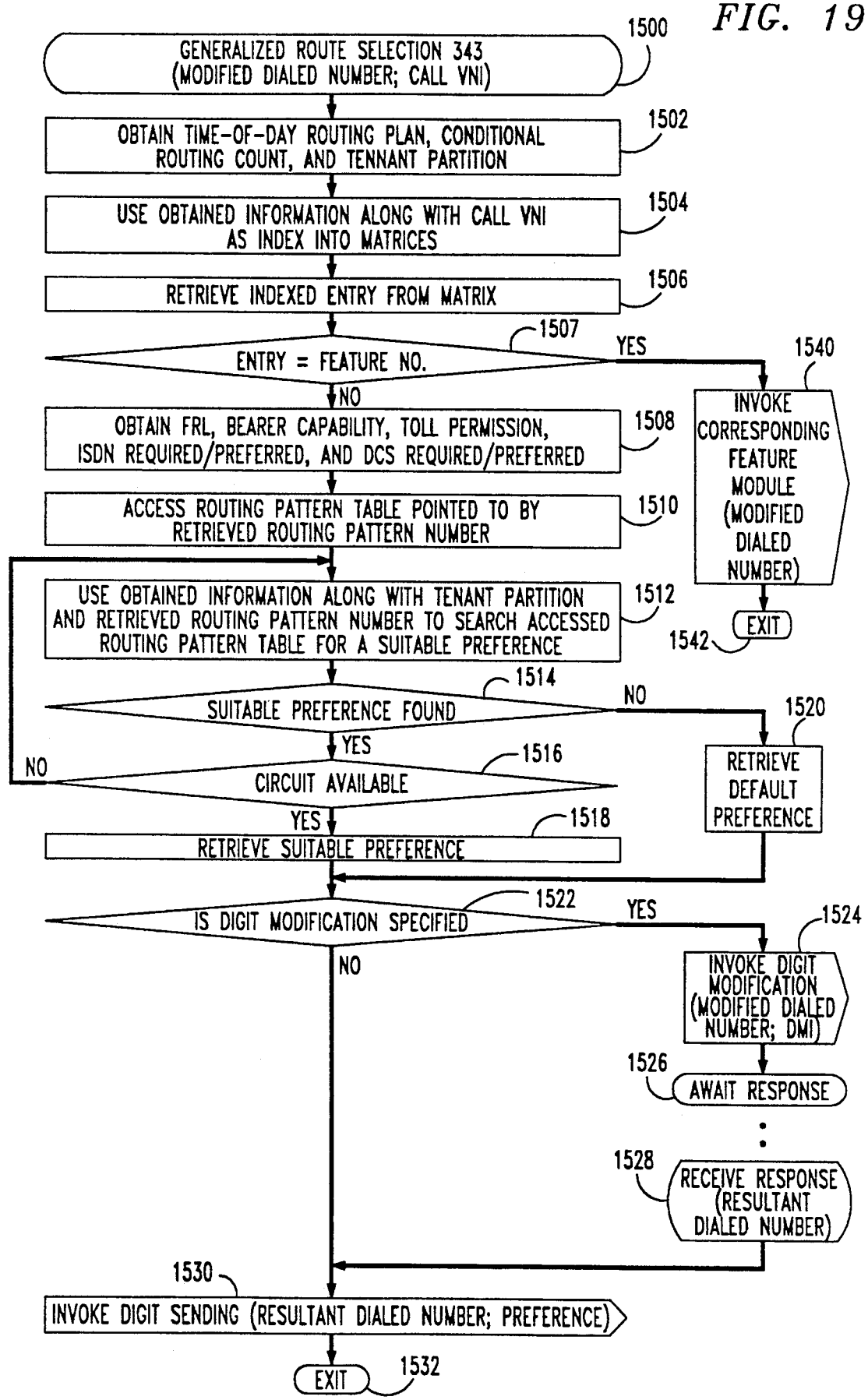
FIG. 19 is a flow diagram of a function of generalized route selection of FIG. 3.
Figure 20:
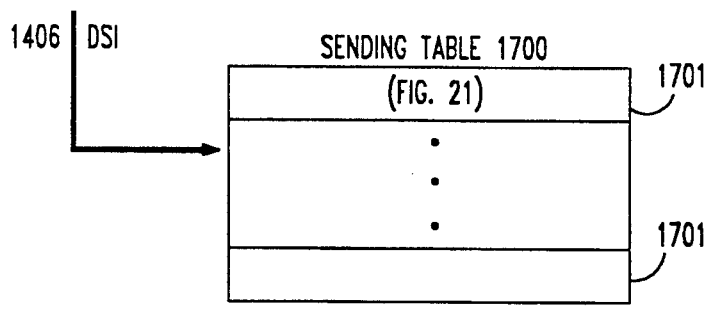
FIGS. 20-21 are block diagrams of data structures of digit sending of FIG. 3.
Figure 21:
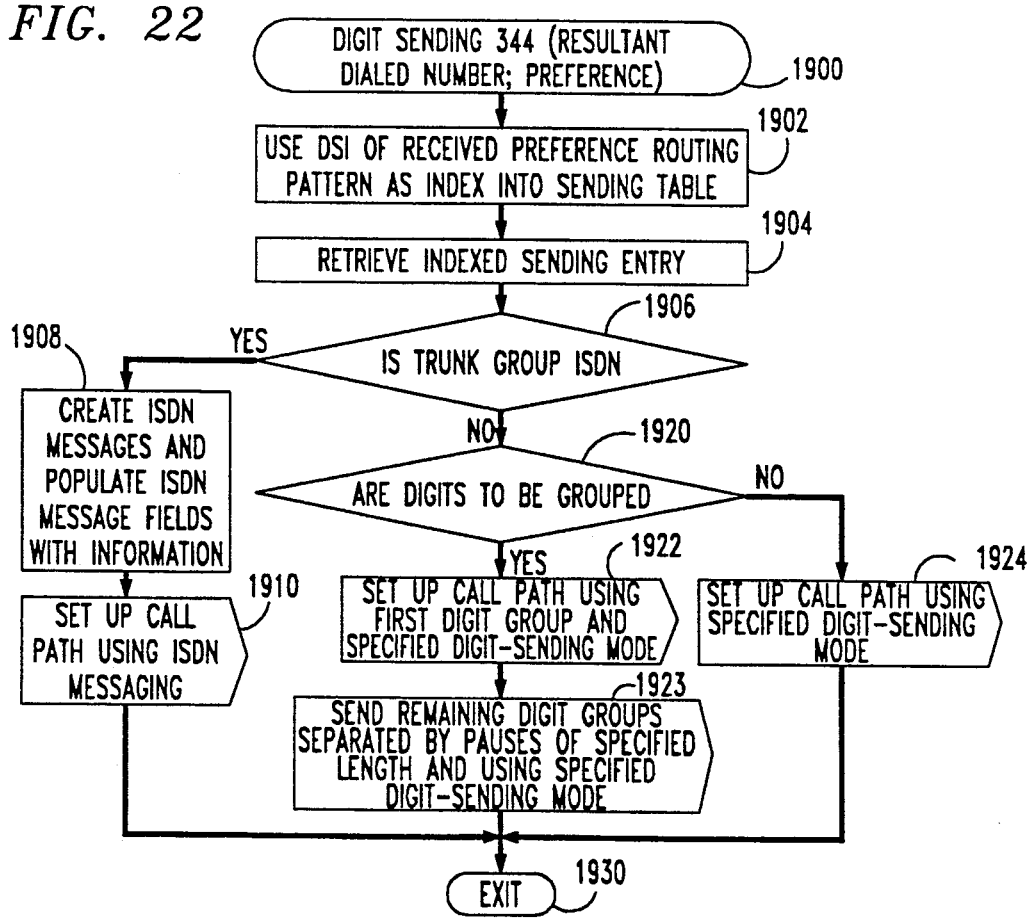

World-class routing 200 has a modular construction, and comprises four self-contained but cooperating modules: a network digit analysis (NDA) module 210, shown in FIGS. 4-13; a generalized route-selection (GRS) module 220, shown in FIGS. 16-19; a digit-modification (DM) module 230, shown in FIGS. 14-15; and a digit-sending (DS) module 240, shown in FIGS. 20-22. Briefly, world-class routing 200 functions as follows.

Network digit analysis 210 implements the syntax and grammar of one or more network numbering plans. It functions as a parser and analyzer of received symbol sequences received from outpulsed signal-collection program 201, and uses the syntax and grammar to perform the parsing and analysis functions. Hereinafter, for convenience, the symbols are referred to individually as dialed digits, and collectively the received symbol sequence is referred to as a dialed number. Analysis may show that a tone needs to be returned to the source of the dialed number. For this purpose, network digit analysis 210 has a connection to a tone-generation facility 262, which is illustratively one of the service circuits 14. Analysis may also show that the dialed number may need to be modified and then re-analyzed; for this purpose, network digit analysis 210 depends upon digit modification 230 to perform the requisite modifications. The result of the analysis is a resultant dialed number, an index (VNI) for an endpoint or feature that the caller is trying to reach, and permissions information for the call. Network digit analysis 210 supplies these to generalized route selection 220.

Generalized route selection 220 determines the feature or best-choice route to be used for the call. It uses the endpoint identifier and information obtained from time-of-day program 203 and translations and status 204 to convert the received identifier into a feature number or a routing pattern number, and then uses the pattern number to select a trunk group over which the call is to be routed. The results of the functions of generalized route selection 220 are either an invocation of a feature module 205, or a digit sending index, a selected trunk group, and information on signaling characteristics. Generalized route selection 220 supplies the route-relating results to digit sending 240.

Digit sending 240 uses the digit sending index to retrieve further information on call-establishment signaling characteristics, and then uses the full complement of the received information to define the control signals which are to be outpulsed. It makes use of digit modification 230 to convert the resultant dialed number into an outpulsed number for outpulsing. Digit sending 240 then causes connection-establishment program 202 to establish a requisite connection having the requisite characteristics over the selected trunk.

The total collection of received outpulsed control signals consists of the dialed number which may or may not be preceded by a network dial-access code (DAC). The dial-access code identifies the network that the user is attempting to reach. The absence of a dial-access code is interpreted as the selection of a default network. For example, it is common in many private multi-premise networks to initially dial a "9" or an "8" to respectively signal a desire to use the public telephone network or a private network; the absence of the "9" or "8" indicates that the dialed number refers to an extension or feature on the receiving switching system 10 itself, commonly referred to as the internal dialing plan. Or, in the public network, it is common to initially dial a "10XXX" to designate which inter-LATA carrier's network the user is trying to reach; in the absence of the "10XXX" prefix, the call is routed to a default carrier's network. In the above examples, the "9", "8", and the "10XXX" serve as the dial-access codes. Initially, network digit analysis 210 merely converts the dial-access code or its absence into a network number which identifies to network digit analysis 210 the network which the user is attempting to use. But more commonly, this conversion may be done by a separate internal dial plan program (not shown) that may be used to interface outpulsed signal-collection program module 201 to network digit analysis 210. Every network may use a different numbering plan each having its own grammar and syntax, and hence the network number identifies to network digit analysis 210 the numbering plan that should initially be used in analyzing the dialed number.

The data structures of network digit analysis (NDA) 210 are shown in FIGS. 4-8. Network digit analysis 210 includes a plurality of network syntax trees 320. A network syntax tree 320 is a data structure whose records are organized in a hierarchical tree structure. Each network number has its own network tree 320 associated therewith. The records of a network tree 320 define the syntax of the network's dialing plan. Each network tree 320 has three types of records: a network root 310, branch nodes 311, and leafs 312. Records 310-312 are hierarchically interconnected by paths 313. Network root 310 is the entry point into network tree 320. Branch nodes 311 and leafs 312 lie in a plurality of hierarchically-organized levels that subtend network root 310. Each branch node 311 is merely a decision point within a network tree 320. Which branch node 311 within network tree 320 is reached is a function of the dialed digits. Likewise, the path 313 that is taken out of that node 311 is a function of the following dialed digits. This may include a "wild card" path 313, which is taken either when no other path 313 is specifically defined for the particular dialed digit or when subsequent dialed digits render the specifically-defined path invalid. This allows for a "default" string identifier, where no specific digits are administered for the "default" string. Each path 313 from a node 311 terminates either in another branch node 311 or in a leaf 312. The particular set of dialed digits that results in a leaf 312 being reached is referred to as a string identifier. In other words, a string identifier consists of the dialed digits that are used to traverse a network tree 320 from network root 310 to leaf 312. For example, in FIG. 4, the string identifier of the leaf 312 shown on the right-hand side of the figure is "PNC". This may illustratively correspond to a particular area code in the North American public network numbering plan.

The string identifier forms the most-significant digits of a digit sequence referred to as a string. Strings are digit, or other symbol, sequences that are defined for, i.e., that have a meaning within, a network numbering plan. Thus, they are the constituent members of the network numbering plan. Each leaf 312 defines a string. Hence, each defined string has its own associated leaf 312.

Figure 5:
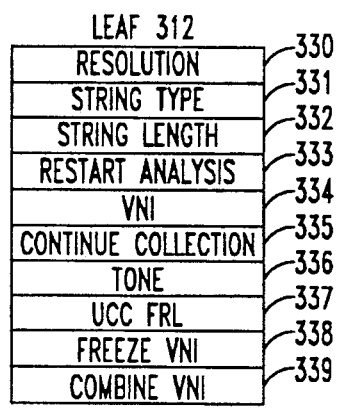

As shown in FIG. 5, a leaf 312 is implemented as a database record that holds information entries 330–339 that define the associated string. The information entries held by each leaf 312 include: resolution 330, string type 331, string length 332, restart analysis 333, virtual nodepoint index (VNI) 334, continue collection option 335, tone option 336, unauthorized call control facilities restriction level (UCC FRL) 337, freeze VNI option 338, and combine VNI option 339.

Resolution 330 specifies whether leaf 312 corresponds to a call route-specifying or to a call feature-specifying string. String type 331 holds a number that identifies the string type. In the illustrative example of the North American public network numbering plan just given, swing type 331 would hold a number that identifies this string type as an area code. String type 331 serves as as an interface to the numbering plan grammar which is defined by the data structures of FIGS. 7 and 8. That grammar defines permissible contexts of, or relationships between, (e.g., permissible combinations and sequential orderings of) the various string types.

String length 332 specifies the permissible range of the length of the string, by specifying the maximum and minimum length-range boundaries. String length is permitted to be any range that includes (is equal to or greater than in this illustrative example) the length of the string identifier. In the illustrative example of the North American public network numbering plan just given, string length 332 would specify the same minimum and maximum length-range boundaries corresponding to a fixed string length of 10 digits (area code – 3, plus office code – 3, plus subscriber number – 4).

Restart analysis 333 holds information that interfaces, or relates, different numbering plans to each other. It holds a digit modification index (DMI) that specifies how the dialed digits of the string should be modified. Digit modification 230 does the actual modifying, and DMI serves as a pointer to a digit modification table entry (see FIG. 14) that specifies the digit modification to be performed. Restart analysis 333 also identifies the network of re-analysis, i.e., the network number whose network tree 320 is to be used to re-analyze the string following its modification. Restart analysis 333 further specifies whether the modified string is or is not to be re-analyzed; the former is the normal condition. In the illustrative example of the North American public network numbering plan just given, if the specified area code corresponds to a private network that internally uses 7-digit numbers, restart analysis 333 holds a DMI that points to the appropriate 10-to-7 digit conversion algorithm, identifies the network number that corresponds to the subject private network, and specifies that re-analysis is to be performed.

VNI 334, the virtual nodepoint index, specifies call-feature or network-routing information for the string, in terms of an index which is used by generalized route selection 220 to find either a feature or a route for the call. It is part of an expression of the string's influence on selection of a feature or a route for the call.

Continue collection 335 indicates whether or not any additional string will or will not follow this string in the sequence of dialed numbers, by indicating whether outpulsed digit collection (performed by function 201) is to stop or is to continue after receipt of this string.

Tone 336 indicates the type of tone or other caller-perceivable signal, if any, that is to be returned as feedback to the outpulsing entity (e.g., to a user at a terminal 17) following the receipt of this string.

UCC FRL 337 specifies the permissions level that a user must have in order to be allowed to access the endpoint or service that corresponds to the string. It may be used, for example, to block certain users' access to 900-type numbers.

Freeze VNI option 338 indicates if this string is the route-determining/feature-determining string of the dialed number. If so, the VNIs of any other strings that follow this string in the dialed number will be discarded. This will be true even if freeze VNI option 338 of any of these following strings is set. It is also a part of the expression of the string's influence call feature or route selection.

Combine VNI option 339 indicates whether or not—and if so, how—the the VNI of this string should be combined with the VNIs of strings that preceded this string in the dialed number. Combine VNI option 339 thus allows route selection to be progressively impacted based upon the particular strings that are identified. While any function could conceivably be employed to combine VNIs, concatenation and addition are most likely to be used. It is also a part of the expression of the string's influence on call feature or route selection.

As string length entry 332 implies, strings may be of different length, i.e., be composed of different numbers of digits. Hence, different paths 313 extending from a branch node 311 may be reached by the same dialed digit, and which path 313 is reached by the dialed digit is a function of the number of digits that were dialed. For example, as shown in network tree 320 which corresponds to network number 300, both "AB" and "ABCD" may be defined strings. Whether the second dialed digit "B" reaches a leaf 312 that defines one of the strings "AB", or merely reaches a branch node 311 that is on the path to the leaf 312 that defines the string "ABCD", is a matter of what, if anything, is dialed after the digit "B". This will be explained more fully below.

Also, identical strings may be defined in a plurality of network trees 320. Furthermore, the identical string may have the same definition or different definitions in a plurality of trees 320.

It is by means of a network syntax tree 320 that the syntax of a numbering plan is defined. To define the syntax of a numbering plan, a system administrator merely creates a network tree 320 and populates its leaf entries 330–339. To modify or expand an existing numbering plan, the system administrator merely adds branch nodes 311 and leafs 312 to network tree 320, or changes the dialed digits that correspond to particular paths 313 within network tree 320, or merely changes the information stored in one or more entries 330–339 of one or more leafs 312. The structure is completely flexible, allowing an administrator to provide any number of records that may be needed. As branch-defining and leaf-defining memory resources are needed, they are removed from a common pool of database records that represent branches and leaves, so that each network dial plan can be as complex or as simple as is necessary while using memory resources most efficiently.

The tree structure makes the analyzing of dialed digits very simple. The dialed digits are merely used one-by-one to index front root 310 down tree 320, until one or more leafs 312 are reached. The reaching of a leaf 312 means that a string in the dialed number possibly has been identified. The strings defined by the reached leaves 312 are referred to as "candidates". Candidates are checked against grammar rules defined by the data structure of FIG. 7 to determine their suitability. Subsequent dialed digits are used to select between multiple reached leaves 312. Once a single candidate leaf 312 has been selected, any subsequent dialed digits are considered to be a part of a next separate string, and the indexing process is repeated. Hence, no sorting or searching is required for digit analysis. Rather, only a predetermined maximum number of record reads—corresponding to the maximum string identifier length—is required to reach an analysis endpoint, thereby guaranteeing that the parse of any symbol string will be effected in a known maximum time period. If the numbering plan is such that leading dialed digits of numerous dialed numbers tend to be repeated (e.g., an area code and an office code might both be the same sequence of the same three digits), the storage is non-duplicative and hence is very compact. Also, string identifiers never need to be explicitly stored, thereby conserving memory space. Rather, dialed digits merely act as pointers to a sequence of database records.

Figure 6:
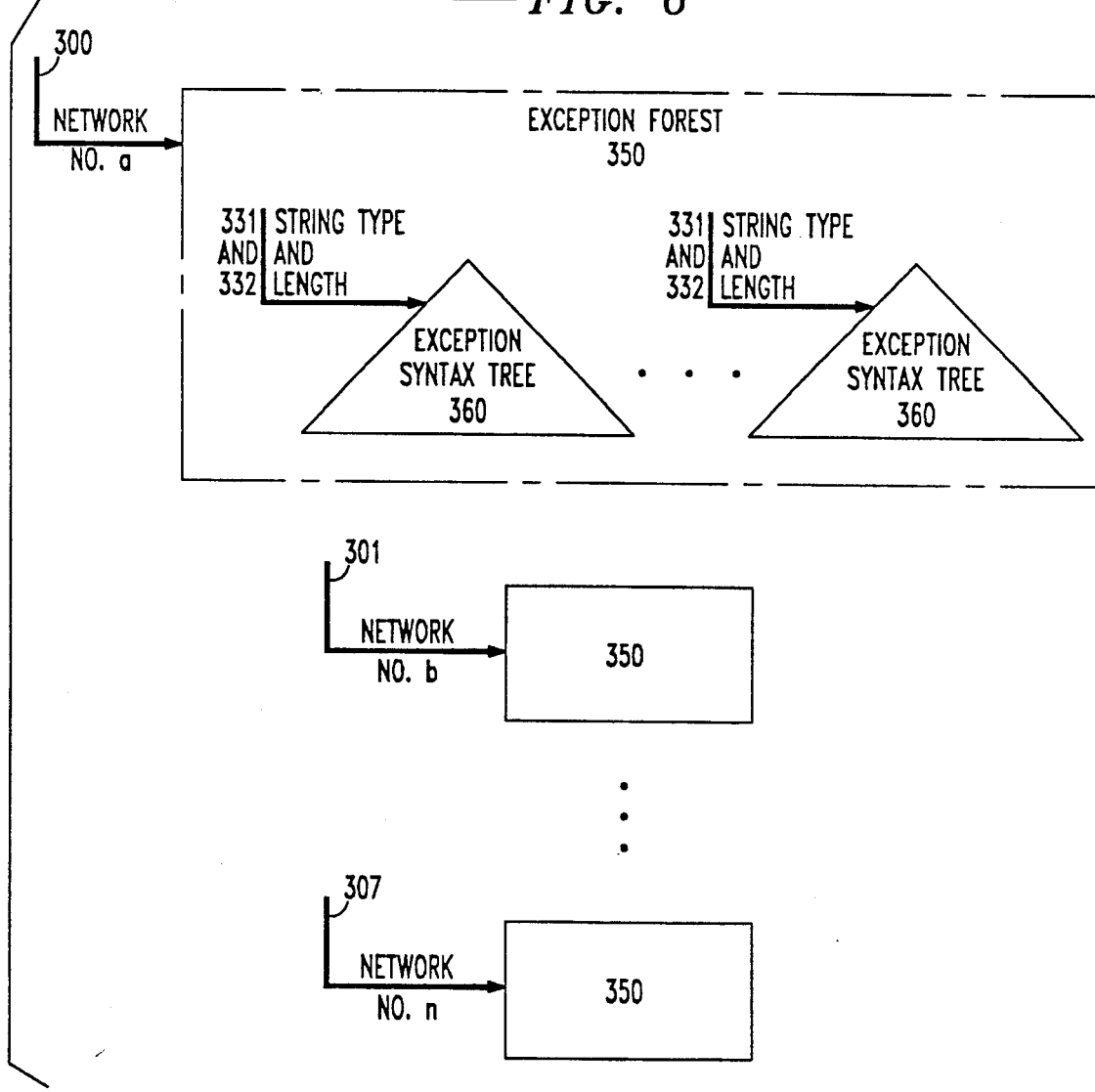

In addition to having an associated network syntax tree 320, each network number has an associated exception forest 350, shown in FIG. 6. Exception forests 350 serve to identify exceptions to the string definitions found in leafs 312 of network syntax trees 320. Each exception forest 350 includes one or more exception syntax trees 360. Each exception syntax tree 360 is structured identically to a network tree 320 (as shown in FIG. 4). As with network trees 320, the network number serves to identify the corresponding exception forest 350. For efficient access, desired exception tree 360 is identified by a string type and a swing length. The string type and string length which are used to index into an exception forest 350 are the contents of entries 331 and 332 of a candidate leaf 312 that has been found in network tree 320 to correspond to the string that is being analyzed.

Figure 7:
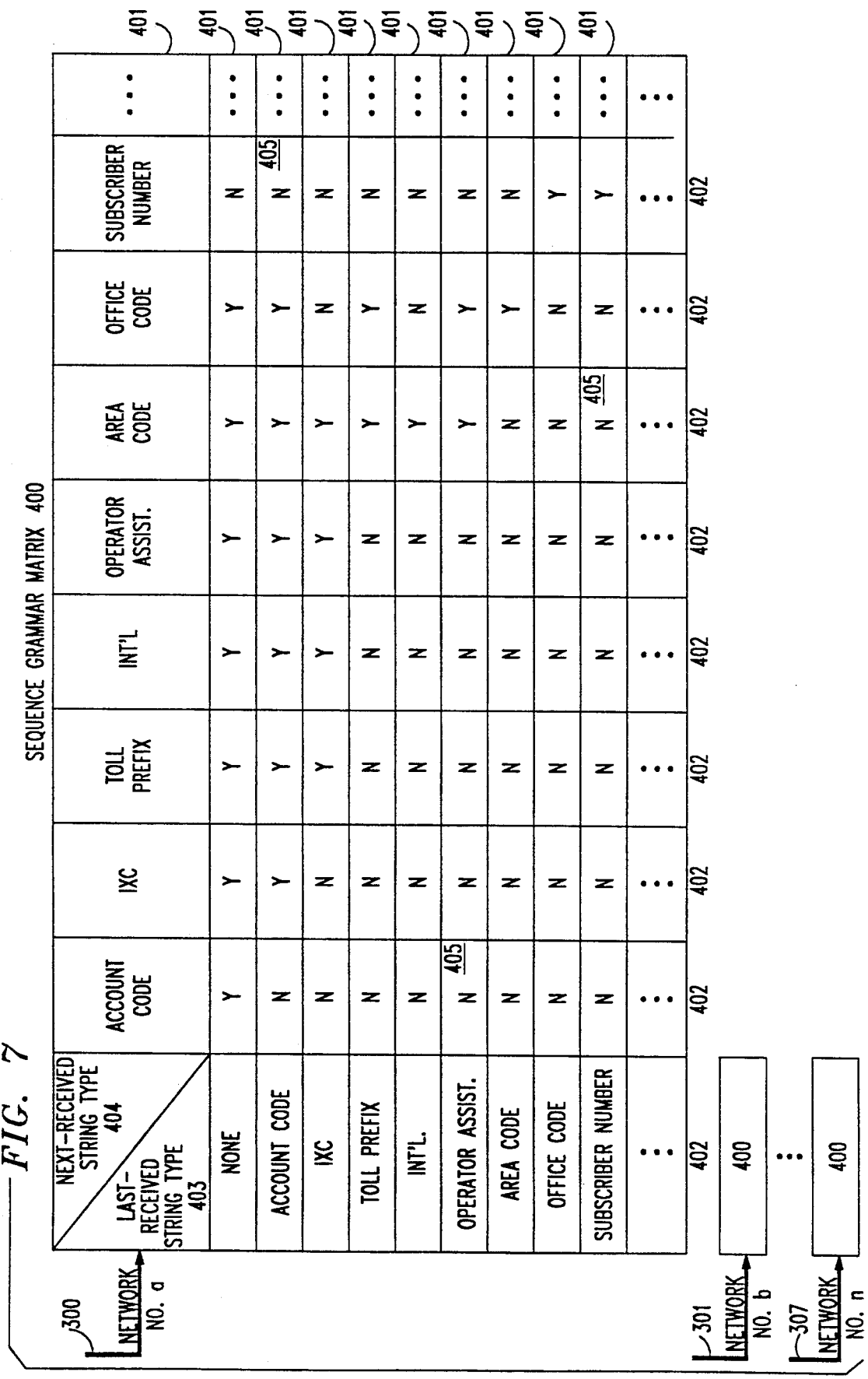

As has already been mentioned, network digit analysis 210 further includes separate data structures that define the grammar of the network numbering plan. These are shown in FIGS. 7 and 8. Each network number has its own sequence grammar matrix 400 of FIG. 7 and combine grammar matrix 410 of FIG. 8. Each matrix 400 (410) comprises a plurality of rows 401 (411) and columns 402 (412). Each row 401 (411) corresponds to a different one of the defined string types (331 of FIG. 5) for the network dialing plan, as does each column 402 (412). Hence, the number of rows 401 (411) and columns 402 (412) depends upon the number of defined string types. The intersection of a given row 401 (411) and column 402 (412) forms an entry 405 (entries 415 and 416) whose contents define permissible contexts or relationships between the corresponding string types.

On the one hand, an entry 405 of sequence grammar matrix 400 formed by an intersecting row 401 and column 402 defines whether the string type that corresponds to the column 402, referred to as next-received string type 404, is allowed to follow in a dialed number the string type that corresponds to the row 401, referred to as last-received string type 403. Matrix 400 thus defines permissible sequential ordering of string types within dialed numbers. The filled-in sequence grammar matrix 400 shown in FIG. 8 is illustratively populated with information that applies to the North American public network numbering plan.

On the other hand, first entry 415 of combine grammar matrix 410 formed by an intersecting row 411 and column 412 defines whether VNI 334 (see FIG. 5) of the string type that corresponds to the column, referred to as received string type 414, is allowed to be combined with VNI 334 of the string type that corresponds to the row, referred to as retained string type 413. And second entry 416 formed by the same row 411 and column 412 as first entry 415 defines the string type that is retained and associated with the combined VNI. The string type defined by second entry 416 becomes the next retained string type 413. Matrix 410 thus defines string-type combinations that can share in defining a call feature or call route. The topmost combine grammar matrix 4 10 shown in FIG. 8 is illustratively populated with string types of the North American public network numbering plan. For this particular plan, entries 4 15 take on the same values as corresponding entries 405 of sequence grammar matrix 400 of FIG. 7, whereas entries 416 take on the values of the received string type 414.

An alternative implementation of FIG. 8 may have a plurality of combine grammar matrices 410 for each network number, one for each combinational function specifiable by combine VNI options 339 of leafs 312 of network syntax tree 320 for that network number.

The functionality of network digit analysis 210, including the use of the data structures of FIGS. 4–8, is illustrated in FIGS. 9–12. Network digit analysis 210 includes two functions: a string-identification function 340 diagrammed in FIGS. 9–12, and a string-action function 341 diagrammed in FIG. 13.

String-identification function 340 identifies a string based on the dialed digits, string length, and string context (the identity, string type, of any preceding strings). It is used to recognize (e.g., identify and validate) all strings of a dialed call-control symbol sequence. It is initially invoked for a call at step 500 in response to receipt of collected digits from program 201. Function 340 accesses call record 271 (see FIG. 3) of the call to obtain stored information about the call, at step 502. Upon initial invocation of function 340 for a call, that call's record 271 is empty. No dialed digits have previously been received and stored for the call, so step 504 is a null step, and function 340 proceeds to step 506.

As was mentioned above, the dialed digits are accompanied either by a dialed access code or by a network number, and function 340 first determines from the received information the network number that is to be presently used and stores it in network number entry 252 of call record 271, at step 506. Function 340 then applies the set of dialed digits obtained at step 504 to network tree 320 that corresponds to the determined network number, at step 508. Function 340 uses the dialed digits one-by-one to select and traverse paths 313 of network tree 320. As function 340 traverses paths 313 of tree 320, it populates a stack 251 of call record 271

(see FIG. 3) for this call with candidates for the strings' identity, putting them on stack 251 in the order of their lexicographic matchability, at step 510. In other words, function 340 traverses paths 313 of tree 320 based upon the dialed digits, searching for leaves 312. Any leaves 312 that it encounters during its traverse, it places on stack 251, in the order in which they were encountered. Stack 251 is a conventional last-in, first-out buffer data structure created on a per-call basis. The most generic leaves 312, offering the most loosely-fitting definitions, are encountered first in network tree 320, so they are placed at the bottom of stack 251, while more specific leaves 312, offering the more precise definitions, are encountered later in network tree 320 and so they are placed closer to the top of stack 251. Function 340 continues to traverse network tree 320 until it either reaches a leaf 312 at the end of every possible path or until it runs out of dialed digits, whichever is first. For example, referring to FIG. 4, if the presently-used network number is "a" and the received dialed digits are "ABC", following step 510, stack 251 contents include, from the bottom of stack 251 up, the two leaves 312 reached by digits "AB", and intermediate node 311 reached by digits "ABC". On the other hand, if the received dialed digits are "ABCDE", stack 251 contents include the two leaves 312 reached by digits "AB", and leaf 312 reached by digits "ABCD". As to which of the two leaves 312 reached by digits "AB" would be lowest on stack 251 is determined by the contents of their respective string length entries 332: the shorter the string length, the more generic the definition. Hence, the leaf 312 specifying the shorter string length would be placed lower on stack 251. Function 340 also places on stack 251 any branch nodes 311 that it has reached upon running out of received dialed digits.

Returning to FIG. 9, following step 510, function 340 initializes a number-of-digits-needed entry 258 of call record 271 to some high number, e.g., infinity, at step 514. Function 340 then proceeds to candidate selection activities, at steps 516 et seq. Function 340 accesses stack 25 1 and retrieves therefrom the top stack entry, at step 516. If no stack entry is available because stack 251 is empty, as determined at step 518, function 340 checks a candidates-remain flag 259 of call record 271, at step 520. This flag indicates whether there is any further possibility of a string definition being found for the received dialed digits. Flag 259 is initially cleared for a call, resulting in a negative answer at step 520. Function 340 therefore causes the call to be given default treatment, such as return of a reorder tone to the caller, at step 522. Call-processing functions for the call are thus completed, and function 340 exits, at step 524.

Returning to step 518, if stack 251 is not empty, function 340 checks the retrieved top stack entry to determine whether it is a leaf 312 or a branch node 311, at step 526. If the retrieved stack entry is a branch node 311, function 340 determines from network tree 320 the number of digits that are needed to reach the nearest leaf 312 from that branch node 311, at step 528. Function 340 then compares this number against contents of number-of-digits-needed entry 258 of call record 271, at step 530. If the determined number is smaller than the contents of entry 258, function 340 sets contents of entry 258 to the determined number, at step 532. Following step 532, or if the check at step 530 shows that the determined number is not smaller than the contents of entry 258, function 340 discards the retrieved stack entry, at step 536, and returns to step 516 to retrieve the next stack 251 entry.

Returning to step 526, if the retrieved stack entry is a leaf 312, function 340 checks whether string type 331 of retrieved leaf 312 satisfies the requirements of the sequence grammar, at step 534. Function 340 performs this check by accessing sequence grammar matrix 400 of the network number held by network number entry 252 of call record 271. Function 340 then applies contents of string type 331 of retrieved leaf 312 as next-received string type 404 to that matrix 400, and applies the contents of a last-received string type entry 255 of call record 271 as a last-received string type 403 to that matrix 400. Function 340 then examines the corresponding entry 405 of matrix 400 to determine whether it contains an affirmative or a negative response. If list-received string type entry 255 is empty, this string is the first string to be received for the call, and so the requirements of the sequence grammar must be satisfied thereby. Therefore, any candidate string corresponding to a subscriber number would be discarded in the case of the North American numbering plan. If the response obtained at step 534 is negative, function 340 discards retrieved leaf 312, at step 536, and proceeds to step 516 to retrieve the next stack entry. But if the response obtained at step 534 is affirmative, function 340 proceeds to the steps of FIG. 11.

Figure 9:
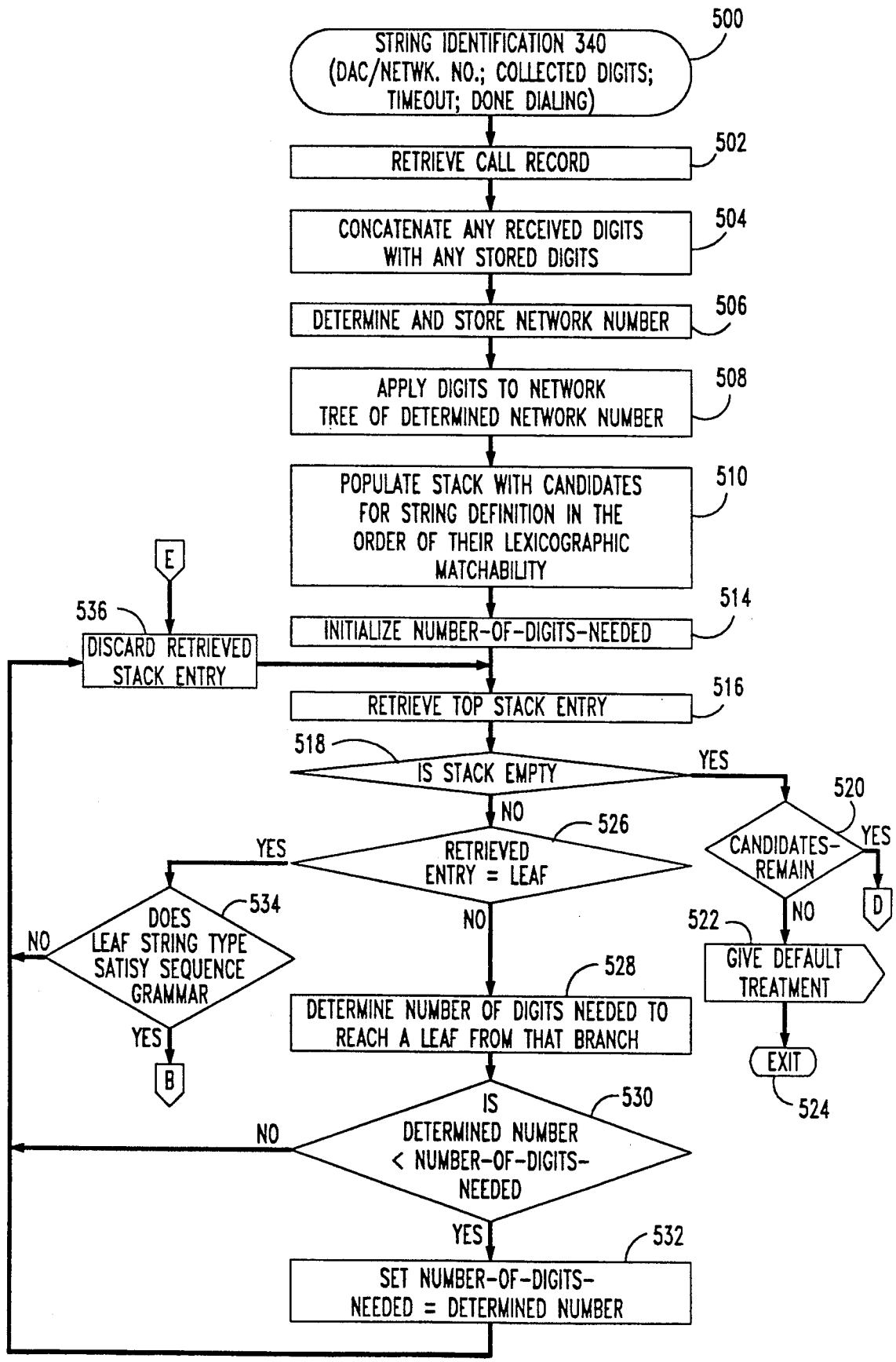
FIGS. 9-12 are a flow diagram of a string identification function of network digit analysis of FIG. 3.
Figure 10:
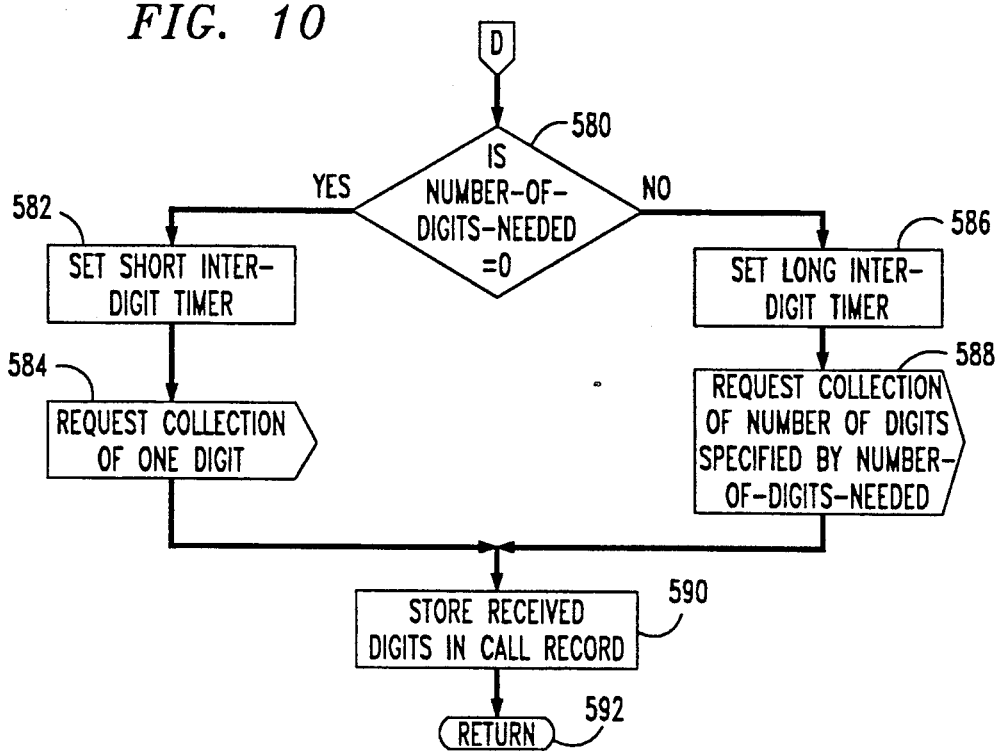

Returning to step 520 of FIG. 9, if function 340 finds candidates-remain flag 249 of call record 271 set, it proceeds to the steps of FIG. 10. Function 340 checks whether contents of number-of-digits-needed entry 258 of call record 271 is zero, at step 580. If so, function 340 sets a short (e.g., 3 second) inter-digit timer 261 associated with outpulsed signal-collection module 201 (see FIG. 3), at step 582, and directs module 201 to collect one digit, at step 584. If contents of entry 258 are not found to be zero at step 580, function 340 sets a long (e.g., 10 second) inter-digit timer 260 associated with outpulsed signal-collection module 201 (see FIG. 3), at step 586, and directs module 201 to collect the number of digits indicated by contents of entry 258, at step 588.

Timers 260 and 261 indicate to program 201 the maximum amount of time that is allowed to elapse between the dialing of individual digits by a user. Long inter-digit timer 260 is set at times when the user's failure to dial more digits would result in a logical error and hence the giving of default treatment to the call. Conversely, short inter-digit timer 261 is set at times when it is permissible for the user to have completed dialing, and therefore it is not desirable to wait for the long period of time before responding to the user's input.

Following step 584 or 588, function 340 stores the previously-received dialed digits in dialed digits entry 253 of call record 271 for future use after the requisite number of digits has been collected and returned by module 201, at step 590. Function 340 then returns, at step 592.

Module 201 responds to the digit-collection request by attempting to collect the requested number of digits. If long inter-digit timer 260 has been set and collection of more than one digit was requested, upon the receipt of each digit, module 201 resets long inter-digit timer 260. If program 201 collects the requested number of digits without the set one of the inter-digit timers 260 and 261 having expired, it re-invokes function 340 at step 500 of FIG. 9 and passes it the additional collected digit or digits. If long inter-digit timer 260 expires prior to program 201 having collected the requested number of digits, program 201 re-invokes function 340 at step 500 and passes it whatever number of digits it has collected along with notification that long timer 260 timed out. If short inter-digit timer 261 has been set and expired prior to module 201 having collected the requested one dialed digit, module 201 re-invokes function 340 and returns a notice of short timer 261 timeout.

Returning to FIG. 9, upon its re-invocation at step 500, function 340 retrieves call record 271, at step 502, and concatenates any just-received collected digit or digits with the previously-received collected digits for the call which it had stored in entry 253 at step 590 of FIG. 10. Function 340 then proceeds to steps 506 et seq. to re-populate stack 251 with candidates for the string definition and to try and select a candidate therefrom.

Figure 11:
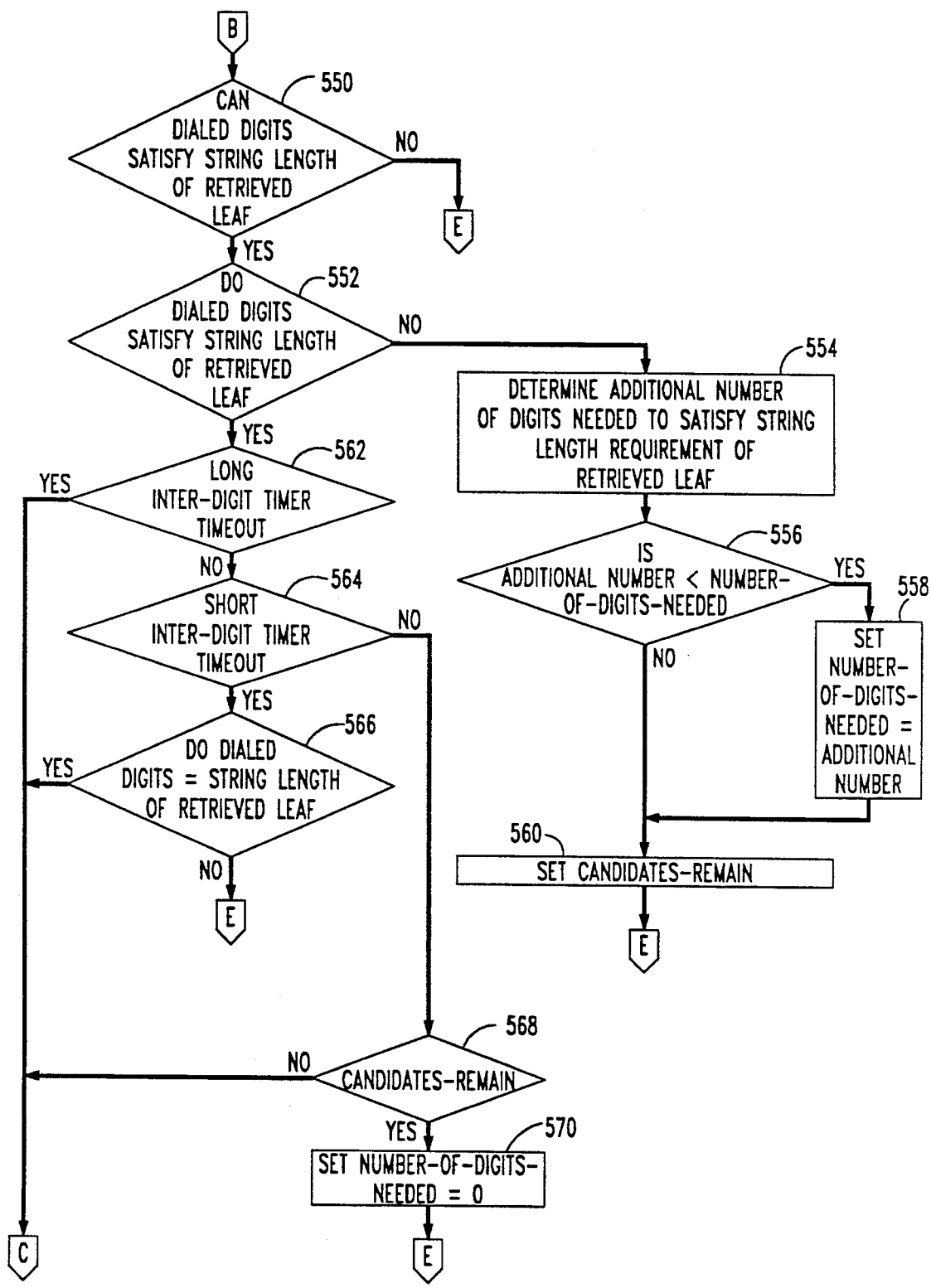

Returning to step 534, if the check there reveals that string type 331 of leaf 312 that has been retrieved from stack 251 does satisfy the requirements set forth in sequence grammar matrix 400 of FIG. 7, function 340 proceeds to the steps of FIG. 11. Function 340 first checks whether the dialed digits could possibly satisfy the retrieved leaf's length requirement as specified by string length 332 of that leaf 312, at step 550. This determination is made by checking whether the number of received dialed digits falls within or exceeds the range specified by string length 332, or whether the number of received dialed digits falls below the range specified by string length 332 but no indication has been received that outpulsed digit collection has ended (such as the caller having dialed an "end-of-dialing" signal, e.g., a "#"). If it is determined that the dialed digits could not possibly satisfy the leaf's length requirements, function 340 returns to step 536 of FIG. 9 to discard the retrieved leaf 312 and then proceeds to step 516 to retrieve the next stack entry.

If it is determined at step 550 that the dialed digits could possibly satisfy the retrieved leaf's length requirements, function 340 checks whether the dialed digits do in fact satisfy those requirements, at step 552. This determination is made by checking whether the number of received dialed digits falls within or exceeds the range specified by string length 332 of retrieved leaf 312. If not, function 340 determines how many additional digits are required to satisfy the leaf's string length requirements, at step 554, and compares this number with the contents of number-of-digits-needed entry 258 of call record 271, at step 556. If the number of additional digits needed to satisfy the leaf's length requirements is smaller, function 340 sets contents of number-of-digits-needed entry 258 to that number, at step 558. Following step 558, or if the number of additional digits needed to satisfy the leaf's length requirements is not smaller than the contents of entry 258, function 340 sets candidates-remain flag 259 of call record 271, at step 560, and then returns to step 536 of FIG. 9 to examine other stack 251 entries.

Returning to step 552, if it is determined that the dialed digits do satisfy the leaf's length requirements, function 340 checks, at step 562, whether it had received a notice of long inter-digit timer 260 timeout at its invocation. If so, function 340 proceeds to FIG. 12. If the answer to the check at step 562 is "no", function 340 checks, at step 564, whether it had received a notice of short inter-digit timer 261 timeout at its invocation. If so, function 340 checks, at step 566, whether the number of dialed digits exactly equals the length requirement of the retrieved leaf 312. The only way that the number of dialed digits can exactly equal the length requirement is if the string-length range specified by string length 332 of retrieved leaf 312 is one and its range boundaries equal the number of dialed digits. If the answer at step 566 is "yes", function 340 proceeds to FIG. 12. If the answer is no, function 340 returns to step 536 of FIG. 9.

Returning to step 564, if it is there determined that function 340 was not invoked in response to timeout of short inter-digit timer 261, function 340 checks whether candidates-remain flag 259 of call record 271 is set, at step 568. If not, function 340 proceeds to FIG. 12; if so, function 340 sets contents of number-of-digits-needed entry 258 of call record 271 to zero, at step 570, and then returns to step 536 of FIG. 9.

Turning to FIG. 12, it shows the activities that string identification function 340 performs to determine whether an exception tree 360 candidate leaf should be substituted for candidate leaf 312 selected from network tree 320. Function 340 uses the network number stored in network number entry 252 of call record 271 to select an exception forest 350 (see FIG. 6), at step 800. It then uses string type 331 and string length 332 entries of selected candidate leaf 312 to select an exception tree 360 from selected exception forest 350, at step 802. Finally, function 340 applies the string of received dialed digits to selected exception tree 360, at step 804, in the same manner as was described for step 508 of FIG. 9, to determine if tree 360 contains an exception leaf 312 that corresponds to this string, at step 806. If there exists an exception leaf 312 that corresponds to this string, function 340 selects it as the candidate for the string instead of leaf 312 that had been selected in FIGS. 9–11, at step 808. Following step 806 or 808, function 340 stores contents of string type 331 of whichever leaf 312 is selected in last-received string type entry 255 of call record 271, at step 810. Function 340 then invokes string-action function 341 of FIG. 13, at step 812, passes to it the presently-used network number, the string, and the selected leaf 312, and returns, at step 814.

Upon being invoked, at step 900 of FIG. 13, string-action function 341 examines entries 330–339 of the received leaf 312 to determine what needs to be done, at step 902. If a feedback signal (tone in this example) is specified by tone entry 336 to be given to the user, at step 904, function 341 causes a tone generation 262 service circuit (see FIG. 3) to give the specified tone to the user, at step 906. If restart analysis entry 333 of leaf 312 contains a digit modification index (DMI), it indicates that digit modification is specified, at step 908, so function 341 invokes digit modification 230, at step 910. As part of the invocation, function 341 passes to digit modification the received string, and the DMI from entry 333 of received leaf 312. Function 341 then awaits the receipt of the digit-modification result, at step 912.

Digit modification 230 comprises a data structure shown in FIG. 14 and a function shown in FIG. 15. The data structure is a table 1000 of entries 1001 which are accessed by a received DMI 1020. Each entry comprises three fields 1010–1012. Delete digits range field 1010 specifies the range of digits, if any, in terms of digit positions within the received string, which is to be deleted from the string. Insert digits range field 1011 specifies the range of digits, if any, in terms of digit positions within the received string, which are to be inserted, and insert digits field 1001 specifies the actual digits that are to be inserted.

Upon its invocation, at step 1100 of FIG. 15, a digit modification function 342 uses DMI 1020 which it received as part of its invocation to find and access a particular entry 1001 of table 1000, at step 1102. It then performs the modifications specified by the accessed entry 1001 on the string which it received as part of its invocation, at steps 1104 and 1106. Function 342 then returns the modified received string to whoever requested the modification, at step 1108, and exits, at step 1110.

Returning to FIG. 13, function 341 receives the modified string, at step 914, and stores it in dialed digits entry 253 of call record 271 instead of the string that it had received at step 900, at step 916.

If restart analysis entry 333 of candidate leaf 312 does not contain a DMI, as determined at step 908, or following storage of the modified string at step 916, string action function 341 proceeds to steps 918 et seq. to calculate a VNI for the call. Function 341 checks if a "frozen" indicator 257 of call record 271 of the call (see FIG. 3) has been set, at step 918. If so, computation of the VNI for the call has been frozen, so no VNI calculation remains to be done and function 341 proceeds to steps 950 et seq. If the call record's "frozen" indicator 257 is not set, function 341 checks combine VNI entry 339 of the received leaf 312 to determine if it is set, at step 930. If it is also not set, function 341 stores the contents of VNI entry 334 of leaf 312 in call VNI field 254 of call record 271, at step 934, discarding in the process any VNI that has previously been stored in VNI field 254. Function 341 also stores the contents of string type entry 331 of leaf 312 in retained string type field 255 of call record 271, at step 946. Function 341 then proceeds to step 948.

Returning to step 930, if combine VNI entry 339 of candidate leaf 312 is set, function 341 checks whether the combine grammar allows the combining to be done, at step 932. Function 341 performs this step by accessing combine grammar matrix 410 (see FIG. 8) of the network number held by network number entry 252 of call record 271. Function 341 then applies contents of string type 331 of the received leaf 312 as a received string type 414 to that matrix 410, and applies the contents of retained string type entry 256 of call record 271 as a retained string type 413 to that matrix 410. Function 341 then examines the corresponding entry 415 of matrix 411 to determine whether it contains an affirmative or a negative response. If retained string type entry 256 of call record 271 is empty, this string is the first string to be received for the call, and so combining is always disallowed, as there is nothing to combine with. If the response obtained at step 932 is negative, function 341 proceeds to step 934. If the response obtained at step 932 is affirmative, function 341 combines any VNI stored in VNI field 254 of call record 271 with contents of VNI entry 334 of received leaf 312 in the manner specified by combine VNI entry 339, at step 940. Function 341 then stores the resultant VNI in VNI field 254 of call record 271, at step 942, discarding in the process the previous contents of VNI field 254. Function 341 also retrieves the new string type that is to be retained and associated with the VNI produced at step 940, at step 944. Function 341 performs this step by proceeding as for step 932, but instead of examining entry 415, it accesses the corresponding entry 416 to obtain therefrom the retained string type. Function 341 then stores the retrieved retained string type 416 in retained string type entry 256, at step 945, and then proceeds to step 948.

At step 948, function 341 checks freeze VNI entry 338 of received leaf 312 to determine if its indicator is set. If so, it means that VNIs of subsequently-received strings are not to affect the call's VNI. Function 341 therefore sets "frozen" indicator 257 of call record 271, at step 949, to prevent contents of call VNI entry 254 from being changed. Function 341 then proceeds to step 950. If freeze VNI entry 338 of received leaf 312 is not set, function 341 proceeds directly to step 950.

At step 950, function 341 checks whether restart analysis entry 333 of received leaf 312 indicates that the modified string obtained at steps 912-914 is to be re-analyzed. If so, function 341 checks whether restart analysis entry 333 specifies a new network number, at step 952. If so, function 341 stores this new network number in network number field 252 of call record 271, at step 954. Following step 954, or if a new network number is not specified at step 952, function 341 re-invokes string identification function 340, at step 958, passing it back the modified string, any new network number, and any indication that dialing has been completed. Function 341 then returns to the point of its invocation, at step 960.

Returning to step 950, if it is found them that re-analysis is not to be performed, function 341 checks, at step 970, whether continue collection entry 335 of received leaf 312 indicates that the just-received string is to be followed by another string in the dialed number. If so, the job of network digit analysis is not yet done, and function 341 re-invokes outpulsed signal-collection module 201 to prompt it to collect more digits, at step 974. But if entry 335 indicates that the just-received string is not to be followed by another string in the dialed number, the job of network digit analysis 210 is done, and function 341 invokes generalized route selection 220, at step 972, and passes it the modified dialed number now stored in dialed digits entry 253 and the call VNI entry 254 of call record 271. Following step 974 or 972, function 341 exits, at step 976.

Generalized route selection (GRS), 220 is shown in FIGS. 16-19. The data structures of GRS 220 are shown in FIGS. 16-18. GRS 220 includes a pair of multi-dimensional (in this illustrative example, four-dimensional) matrices 1200 and 1202 of FIG. 16. Route matrix 1200 is populated with routing pattern numbers 1201, while feature matrix 1202 is populated with feature numbers 1203. The index into matrices 1200 and 1202 is a multi-element entity having one element for each matrix dimension. For the example of four-dimensional matrices of FIG. 16, the matrix index illustratively comprises: call VNI 254, a time-of-day routing plan 1230, a conditional routing count 1231, and a tenant partition 1232. Call VNI 254 is obtained by GRS 220 from NDA 210. Time-of-day routing plan 1230 is conventional and is obtained by GRS 220 from a conventional time-of-day program 203 (see FIG. 3). Conditional routing count 1231 is also conventional and is obtained by GRS 220 either as a trailing digit to a dialed number from an incoming call trunk 16, or from translations 204 (see FIG. 3) that are associated with the trunk group of an incoming call trunk 16 or terminal line 15. Tenant partition 1232 is likewise conventional, and is obtained by GRS 220 from translations 204 that are associated with calling station 17 or incoming call trunk 16. Call VNI 254 is determinative of which one of the two matrices 1200 and 1202 is accessed by the index. Any desired contextual parameters may be used as elements of the multi-dimensional matrix.

A feature number 1203 obtained for a call from feature matrix 1202 identifies the one of feature modules 205 (see FIG. 3) which should be invoked. Alternatively, a feature number 1203 obtained from matrix 1202 may be used as an element of an index into feature pattern tables, similarly to how routing pattern numbers 1201 are used, as described below.

A routing pattern number 1201 obtained for a call from matrix 1200 serves as a pointer to one of a plurality of routing pattern tables 1300 of FIG. 17. Each routing pattern table 1300 has a plurality of entries 1301 each one of which defines a routing preference. The routing preferences are listed in each table 1300 sequentially in the order of their relative preference. The following call characteristics illustratively serve as criteria for selecting a particular routing preference, i.e., entry 1301 of a table 1300: a facilities restriction level (FRL) 1330, a tenant partition 1232, a bearer capability 1331, a toll permission 1332, an ISDN required/preferred 1333, and a DCS required/preferred 1334. The most-preferred preference that meets these criteria and also meets the additional requirement 1335 of having a circuit free and available to carry the call, is selected for the call.

FRL 1330 is conventional and is obtained by GRS 220 either as a trailing digit to a dialed number from an incoming call trunk 16 or from translations 204 (see FIG. 3) that are associated with the originating station 17 or the trunk group of the incoming call trunk 16. Tenant partition 1232 is the same as discussed in conjunction with FIG. 16. Bearer capability 1331 is also conventional and is obtained by GRS 220 either from ISDN messaging that accompanies an incoming call on a trunk 16, or as a default value from translations 204 of either incoming trunk 16 or originating station 17. Toll permission 1332 is likewise conventional and is obtained by GRS 220 from translations 204 of originating station 17 or the incoming call trunk 16. Whether routing over ISDN facilities is required or preferred 1333 is also a conventional item of information and is obtained by GRS 220 either from translations 204 of originating station 17 or is derived from messaging that accompanies a call on the incoming call trunk 16. DCS required/preferred 1334 specifies whether a requested feature is a distributed communications feature (DCS) that requires routing over facilities providing feature transparency between switches in a network (for a description of feature transparency, see U.S. Pat. No. 4,488,004). The information is obtained by GRS from a station-to-station calling feature module. Finally, circuit availability 1335 is determined from line 15 and trunk 16 status records of translations and status 204.

Routing preference 1301 that is selected for a call on the basis of the above-described criteria defines the preferred route for the call and is used by GRS 220 to route the call. An illustrative routing preference 1301 is shown in FIG. 18. It comprises a plurality of information fields 1401–1406. Trunk group number 1401 specifies the group of trunks 16 over any one of which the call may be routed. Sending requirements 1402 specifies how called number information that will accompany the call is to be sent, such as: is a pause required before sending digits, must the system listen for dial tone before sending digits, do digits need to be grouped with pauses, and do individual digit groups get sent via dial pulses or Touch-Tone pulses. Toll information 1403 is a table of exceptions that specifies toll-free telephone numbers for this trunk group. ISDN sending format 1404 specifies which information element (IE) of ISDN messages is to be used for interexchange calls, and the kind of a number (based on CCITT specifications) that will be sent in the IE. Alternatively, both toll information 1403 and ISDN sending format 1404 may be implemented as indexes into associated tables. Digit modification index (DMI) 1405 specifies how the received dialed number is to be modified before being sent out. It is the equivalent of the DMI discussed in conjunction with restart analysis entry 333 of leaf 312 of FIG. 5. And digit sending index (DSI) 1406 is an index for use by digit sending 240 in defining additional digit sending criteria for the call. It will be discussed further in conjunction with digit sending 240.

Generalized route selection function 343 is shown in FIG. 19. Upon being invoked, at step 1500, function 343 proceeds to obtain time-of-day routing plan 1230, conditional routing count 1231, and tenant partition 1232, at step 1502. Function 343 then uses the obtained information along with call VNI 254 as a four-pronged index into multi-dimensional matrices 1200 and 1202, at step 1504, and retrieves the indexed entry 1201 or 1203 from the addressed one of the matrices 1200 and 1202, at step 1506. Function 343 then examines the retrieved matrix entry to determine whether it is a routing pattern number 1201 or a feature number 1203. If the retrieved entry is a feature number 1203, function 343 invokes the corresponding feature module 205, at step 1540, and passes it the modified dialed number that was received at step 1500. Function 343 then exits, at step 1542.

Returning to step 1507, if the retrieved matrix entry is a routing pattern number 1201, function 343 proceeds to obtain FRL 1330, bearer capability 1331, toll permission 1332, ISDN required/preferred 1333, and DCS required/preferred 1334, at step 1508. Function 343 then accesses the one routing pattern table 1300 that is pointed to by the retrieved routing pattern number 1201, at step 1510, and uses the obtained information along with previously-obtained tenant partition 1232 to search the accessed pattern table 1300 for a suitable preference 1301, at step 1512. If a suitable preference 1301 is found, as determined at step 1514, function 343 checks translations and status 204 to determine whether a circuit in that preference 1301 is available for the call, at step 1516. If no circuit is available, function 343 returns to step 1512 to search for another suitable preference 1301. If a circuit is available, function 343 retrieves the preference 1301 information, at step 1518.

Returning to step 15 14, if no suitable preference 1301 is found, function 343 retrieves information defining a default preference 1301, at step 1520. Following step 1518 or 1520, function 343 checks DMI 1405 of the retrieved preference 1301 to determine if digit modification is specified thereby, at step 1522. If DMI 1405 is null, no digit modification is required, and function 343 proceeds to step 1530. If DMI 1405 is not null, digit modification is required, and so function 343 invokes digit modification function 342 of FIG. 15, at step 1524. As part of the invocation, function 343 passes to digit modification function 342 the modified dialed number that it received at step 1500 and the contents of DMI 1405. Function 343 then awaits receipt of the digit-modification result, at step 1526.

Digit modification function 342 responds in the manner discussed in conjunction with FIG. 15. When it returns a resultant dialed number to function 343, at step 1528, function 343 proceeds to step 1530.

At step 1530, function 343 invokes digit sending 240, and passes the resultant dialed number (which could be the modified dialed number received at step 1500 if no additional digit modification was specified at step 1522) and retrieved preference 1301 as parameters. Function 343 then exits, at step 1532.

Digit sending 240 is shown in FIGS. 20-22. It comprises a sending table 1700 of FIG. 20 and a digit sending function 344 of FIG. 22. Sending table 1700 has a plurality of sending entries 1701 each one of which is a set of digit-sending information. Sending entries 1701 are indexed by DSIs 1406. An illustrative sending entry 1701 is shown in FIG. 21. It comprises a plurality of fields 1801-1808. Sending number 1801 specifies the number that should be sent out instead of the received resultant dialed number; when sending number 1801 is null, the received resultant dialed number is sent. Toll prefix 1802 specifies the toll indication, if any—such as "1"—that is to be sent with the number. It also specifies whether the toll prefix is to be sent only with toll calls or with all calls. Interexchange carrier code (IXC) 1803 specifies whether the "10XXX" carrier I.D. code, if any, is to be sent Out for the call. Dial-access code (DAC) 1804 specifies whether the DAC, if any, that is to be sent out for this call. DAC has been discussed above in conjunction with NDA 210. End-of-dialing character 1805 specifies, whether an end-of-dialing character, e.g., "#", is to be sent at the end of the sent-out number. Each field 1802-1805 also specifies the following options for that field's information type: do not send that information type even if it was dialed by the caller; always send the contents of the field even if that information type was not dialed by the caller; and send the information dialed by the caller if the caller dialed the information type, otherwise send the contents of the field. Group digits 1806 specifies whether—and if so, how long—pauses should be used to separate groups of sent digits, and the digit-sending mode (e.g., rotary or pulse) for those groups. ISDN message type 1807 specifies the type of ISDN message that is to be used to send the number. And traveling class mark (TCM) 1808 reflects the call's FRL and conditional routing count, and specifies the zero or more TCMs that are to be sent along with the number.

FIG. 22 charts the operation of digit sending function 344. Upon being invoked, at step 1900, function 344 uses DSI 1406 of received preference 1301 as an index into sending table 1700, at step 1902, and retrieves from table 1700 the indexed sending entry 1701, at step 1904. Function 344 then uses translations and status 204 associated with the trunk group that is specified by field 1401 of received preference 1301 to determine if it is an ISDN trunk group, at step 1906. If so, function 344 creates ISDN messages that are necessary to set up a call path according to information contained in preference 1301, and populates their information fields with information specified by sending entry 1701, at step 1908, in a conventional manner. Function 344 then causes connection-establishment module 202 to set up the desired call path by sending the ISDN messages across a trunk 16 of the trunk group specified by field 1401 of preference 1301, at step 1910, again in a conventional manner. Once the requisite call path is set up, the tasks of world-class routing 200 are completed, and function 344 exits, at step 1930.

Returning to step 1906, if the specified trunk group is not an ISDN trunk group, function 344 checks field 1806 of retrieved sending entry 1701 to determine if digits are to be grouped, at step 1920. If so, function 344 causes connection-establishment module 202 to set up the call path using a first digit group and the digit-sending mode specified by field 1806 of retrieved sending entry 1701, at step 1922, in a conventional manner, by using the information contained in preference 1301 and sending entry 1701. Function 344 then causes connection-establishment module 202 to send the remaining digit groups separated by pauses of length specified by field 1806 of the retrieved sending entry 1701 and using the specified digit-sending mode, at step 1923. Function 344 then exits, at step 1930.

Returning to step 1920, if digits are not to be grouped, function 344 causes connection-establishment module 202 to set up the call path using the digit-sending mode specified by field 1806 of retrieved sending entry 1701, at step 1924, again in a conventional manner, by using the information contained in preference 1301 and sending entry 1701. Function 344 then exits, at step 1930.

The preceding description is deemed adequate for an understanding of the illustrative embodiment of the invention by those skilled in the art. However, for completeness, further reference may be had to the following appendices A-C. These appendices provide more extensive information concerning implementational details of the illustrative embodiment.

Of course, it should be understood that various changes and modifications to the illustrative embodiment described above will be apparent to those skilled in the art. For example, additional parameters can be included in the GRS matrices which cause the VNI to be converted into a routing pattern number. Or, additional parameters can be included in the GRS routing pattern tables and be associated with preferences to aid in the final preference selection. Also, additional string types and grammar rules for string type relationships can be defined. Additionally, a plurality of permissible string lengths may be defined for a given string type, and the use of alphanumeric and other characters within strings may be allowed in addition to digits. Furthermore, exception trees' contents may be incorporated into the main network syntax trees. Such changes and modifications can be made without departing from the spirit and the scope of the invention and without diminishing its attendant advantages. It is therefore intended that all such changes and modifications be covered by the following claims.

APPENDIX A

Network Digit Analysis Rules

Definitions:

dialed digits, dialed digit string - the full sequence of digits which is/has/will be dialed by the caller.

digit string - usually refers to the portion of the dialed digits currently being worked with. It may have digits prior and following.

SI - String Identifier - the first portion of a digit string that can uniquely identify the digit string and it's expected length.

UDP - Uniform Dialing Plan - a definition from the AT&T Definity® G1 PBX whereby an extension number points to an RNX for routing. This is essentially the same as the RNX Routing in AT&T Definity G2.1 PBX.

NUMBERING PLAN ASSUMPTIONS

- All digit strings in a numbering plan can be distinguished by some number of initial digits and the total length of a digit string.

— The unique initial digits are called the String Identifier or "SI"

— The length of number beginning with a SI is called the String Length

- Address digits are those which correspond to the terminal at the distant end of a connection. The intent of the address digit string type is to identify address digits and to allow the identification of other prefixes that generally denote some service, feature or option that the call will use to reach that destination.

- In addition to address digit strings, there are other digit strings, with unique string type indicators, that have special meanings:

— SMDR Account Code (use not recommended, included to preserve G2.1 functionality)

— IXC Prefix ("10"+CIC for example)

— Toll Prefix (typically "1")

— IDDD Prefix (typically "011 or 01")

— Operator Assistance (or Credit Card) (typically "0")

- The special digit strings always precede address strings and the following table tells what type can follow what type. At the start of digit analysis, a string type of 0 (Initial) is defined so that a rule can be established for a valid first string. This is not an administerable string type. The sequence of string types is fixed in G2.2 based upon the North American Numbering Plan rules. This is a table based structure so that a similar table can be created in the future for each network if different formats are required.

| STRING TYPE | | CAN BE FOLLOWED BY: | | | | | |
|---|---|---|---|---|---|---|---|
| | | ACCT | IXC | TOLL | IDDD | OP | ADDR | (RES) |
| 0 | Initial | Y | Y | Y | Y | Y | Y | NO |
| 1 | Acct Code | NO | Y | Y | Y | Y | Y | NO |
| 2 | IXC Code | NO | NO | Y | Y | Y | Y | NO |
| 3 | Toll Prefix | NO | NO | NO | NO | NO | Y | NO |
| 4 | IDDD Prefix | NO | NO | NO | NO | NO | Y | NO |
| 5 | OP Assist | NO | NO | NO | NO | NO | Y | NO |
| 6 | Address | NO | NO | NO | NO | NO | Y | NO |
| 7 | (Reserved) | NO | NO | NO | NO | NO | NO | NO |

- Conflicting numbering plans (for different networks) will not be mixed in the same network.

- Any extra digits after the address is assumed to correspond to account codes or a credit card number to be collected by a downstream switch. Some initial digits may be lost if there is not enough delay since our switch will not be collecting and re-sending these digits. They are considered to be end-to-end signaling digits.

NOTE: This may be a problem for autodialers!

ADMINISTRATION OF DIGIT STRINGS

- Each digit analysis entry is created by specifying a SI and string length. A network cannot contain two identical SIs with the same string length. If the same SI is used for two strings of *different* string lengths, the two strings are called "siblings" and may be of different string types.

- If the toll prefix is to be used for routing (i.e. to distinguish 7-digit from 10-digit strings without timeout as the dial-1 for toll option in G2.1), it must be part of the address string and not administered as the toll prefix.

(An alternative if Standard Network has been paid for, is to administer the "1" as the toll prefix which "restarts" in a different network wherein all translation items are 10-digit numbers and the original network contains the 7-digit numbers.)

- The tone option was added to indicate that dial tone is to be given after the entry of an Account Code. The administration does not limit its use to Account Codes however, it can be used with any string type.

- Network administration must be created to define the entire numbering plan available to the switch user.

- Exception lists can be populated with digit strings that are intended to override a match found in the digit analysis tree.

- Exception list entries are arranged by network, string length, and string type. Exceptions only override network entries of the same length and string type.

Because of this arrangement, there are no variable length digit strings in the exception list. Each different entry must be added independently.

- When an exception is administered, there is no automatic verification that a digit string with the same string length and string type is administered for the network.

- "Wild card" digits can be specified using a special code/character in administration and can be a way of specifying ranges of digit strings (for example, 976 office codes for all area codes would be ***976). "Wild card" digits can be put anywhere in the SI except at the end of the SI.

- SIs containing "wild card" digit(s) can only be put into the exception tree.

DETERMINING A DIGIT STRING MATCH

- Digit collection is set up to collect all digits necessary to distinguish between SIs whose first several digits match. When the digits have been collected, the network administration is examined and additional digits are again collected to reach the next similar decision point. The number of digits to collect works differently depending on digit collection and sending options.

— If overlapped digit collection and sending is not active, enough digits are collected to reach the shortest complete digit string. If it is a variable length string, the upper bound is attempted and shorter dialed strings will result in a standard (10 sec) interdigital time-out.

A dialed "#" forces the time-out action.

— If overlapped digit collection and sending is active, enough digits are collected to match with the shortest SI. Then a single digit is collected with short timing if other matching SIs have been administered.

Overlapped sending is turned off if any of the following are encountered:

— The incoming trunk is expecting two TCMs.

— A dialed number results in a unique SI match (no other choices) but a partial match is found for the dialed number in the exception tree. Overlapped sending is turned off only until it can be verified that the exception entry really matches or not. After verification, overlapped sending is activated if appropriate.

— The digits entered are as a result of an ACD interflow or ACD forwarding.

— The digits entered are as a result of station call forwarding outside.

— The digits entered are as a result of a vector route-to number or digits step.

— The digits are received from a PRI trunk.

— The extension number specifies the use of UDP or ENP.

— The digits are available as a result of station call forwarding.

- Identification of a dialed digit string is based upon a "best match" rule and other possible matches are kept in a "candidate list", in "best match" order. NDA must identify the same strings in the dialed digits whether overlapped sending is active or not active.

— Digits are matched in the order received and are matched against the administered SIs.

— Digits are better matches than "wild cards".

— A longer string match is better than a shorter string match.

— A longer SI match is better than a shorter SI match.

— An exception match takes precedence over a standard match.

- If a string with the "CONTINUE" attribute is the best match, it will be chosen when the number of digits corresponding to its string length have been received.

- If a string without the "CONTINUE" attribute is the best match, i.e. a "terminating" string, all possible matches are sought and the shortest terminating string is used to determine the number of additional digits to collect before re-testing for a digit string match.

- When all candidates remaining are "CONTINUE" strings, the string with the longest SI will be chosen.

- Candidates are eliminated when:

— New digits collected no longer match the candidate's SI.

— The string length of a sibling has been exceeded (a longer sibling is still an active candidate). [Example: 201/7 and 201/10 are siblings. When an 8th digit is dialed, 201/7 is no longer a candidate.]

— A time-out occurs and the candidate's string length is longer than the number of digits collected.

- Where siblings are found, a short interdigit timer is set for the single digit which is one beyond that for the shortest sibling. If it times out, the shorter sibling is chosen. If a digit is entered, the longer sibling is chosen.

If there are more than two siblings, each must have different string lengths and the short timing is done at each digit required to eliminate or accept the shortest sibling.

Similarly, when two non-CONTINUING strings are in the candidate list, a single short interdigital timing digit is collected to distinguish them.

- Extra digits not expected will be ignored by digit analysis.

- Any time a match is found, the exception tree for the network, string type, and string length will be checked for an entry and if a match is found, it's action will be taken instead.

- Exception matching is done prior to any other action (VNI combine, restart, M-to-N conversion, etc).

- If multiple strings of the "address" string type are being analyzed, the entire accumulated address string is used when looking for exceptions.

- The following conditions result in intercept treatment:

— If no match is found (candidate list is empty).

— If the digit string is routed to a pattern that contains no preferences.

— If the digit string is routed to VNI=0 (there is no pattern 0).

CONTINUE/RESTART IMPLICATIONS

- The continue digit collection field (Procedure 314 Word 2 field 1) is an indicator of whether or not the given string is defined as the last string in the dialed number. A value of '0' in this field means the string is the last string. A value of '1' in this field means the string is not the last string, and that digit collection must continue to collect more digits.

— The continue function (a value of '1') is generally used when identifying a toll prefix, IXC, Operator Assist, or International prefix, expecting that additional digits will follow.

— The terminate function (a value of '0') is generally used when identifying an address string and additional digits for digit analysis will not follow. TCMs, for example, may follow. But these digits are not analyzed as a part of digit analysis.

- The restart function (Procedure 314 Word 1 field 11 equal to '1') allows conversion and re-analysis of dialed digit strings.

— Restart with conversion (digit modification index specified in Word 1 field 12) is used to handle home RNXs in the private network, home NPA-NXXs in the public network, and M-to-N digit conversions.

— Restart without conversion (Word 1 field 12 is dashed) is used to separate different numbering plans received over the same network (overflow).

These networks could be subsets of the North American Numbering Plan. For example 7- and 10-digit numbers could be put into different network trees, numbers could be separated based on their local toll/non-toll characteristics, domestic vs international After any necessary conversion is performed, a restarting string may be reanalyzed.

— Restart with re-analysis (Word 2 field 2 is a '0') is normally used when M-to-N conversion changes the dialed digits to a different dial plan (eg: convert a North American Numbering Plan number to a Private Network number).

UDP (RNX Routing) uses this method to convert extension dial plan numbers to private or public network numbers for routing in the appropriate network.

— Restart without re-analysis (Word 2 field 2 is a '1') is used in cases where the route has been determined and M-to-N conversion is being used to change the dialed digits into the format expected by the routing pattern.

The string type of a string is not retained if a restart with re-analysis occurs. The string type will be defined by the re-analysis.

VNI OPTIONS

Virtual Nodepoint Identifiers (VNIs) in V6 correspond to AAR node numbers and ARS routing designators in V5. If call categories are not defined, the VNI is the pattern number to be used for routing.

- A dialed number which does not restart and does not continue must have a VNI associated with it in order to route.

- The VNI can be determined from any substring, the final string, or a combination of both.

— If the VNI of a non-terminating string is to be used exclusively for routing, it must be given a "frozen" characteristic when defining the SI.

Subsequent digit analysis is for digit format validity checking only.

No subsequent M-to-N conversion is performed after a VNI is frozen.

— If a non-terminating string is to define a set of patterns and a following string(s) is to define which member of the set of patterns to use, the "combine" characteristic is defined for the "following" string(s).

When a string administered with the "combine" characteristic is encountered, the VNI of the string is added to the earlier VNI. This "combination" is used as the VNI for routing.

If a restart is done on a string, the VNI can be assigned the "persist" characteristic. Calls will route to this VNI if subsequent analysis results in VNI=0.

RESULTING DIGITS FOR SENDING

- The call proceeds to route selection when a terminating string is encountered.

- If an account code string has been defined and dialed by the user, it is recorded in a call detail record after routing is determined. The digits are not normally used for routing, and the digits are not sent.

The account code prefix digit(s) is(are) eliminated by using the "RESTART" function with digit conversion to delete the digit(s).

- If a toll prefix is detected, the specific digits are stored for possible subsequent use in digit sending. The toll indicator is not retained as part of the subsequent address string.

- Dialing an Operator Assistance or an IDDD Prefix string type will function as if a toll prefix was dialed for toll analysis. These strings are retained as part of the address string sent on to route selection. If they are not to be sent, they must be explicitly deleted.

APPENDIX B
WCR Feature Flowchart
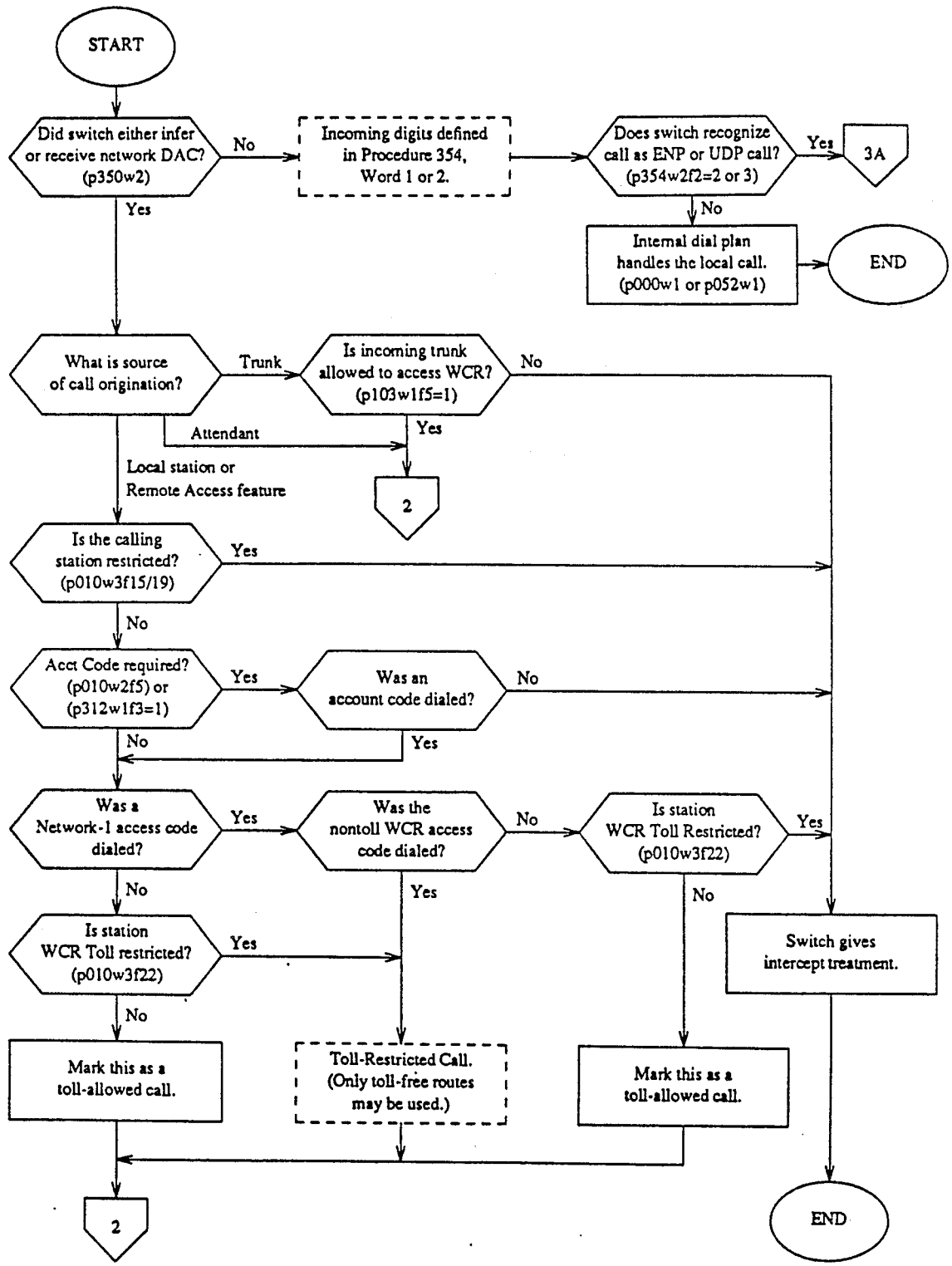
Figure 1. Access to World-Class Routing

Figure 2:
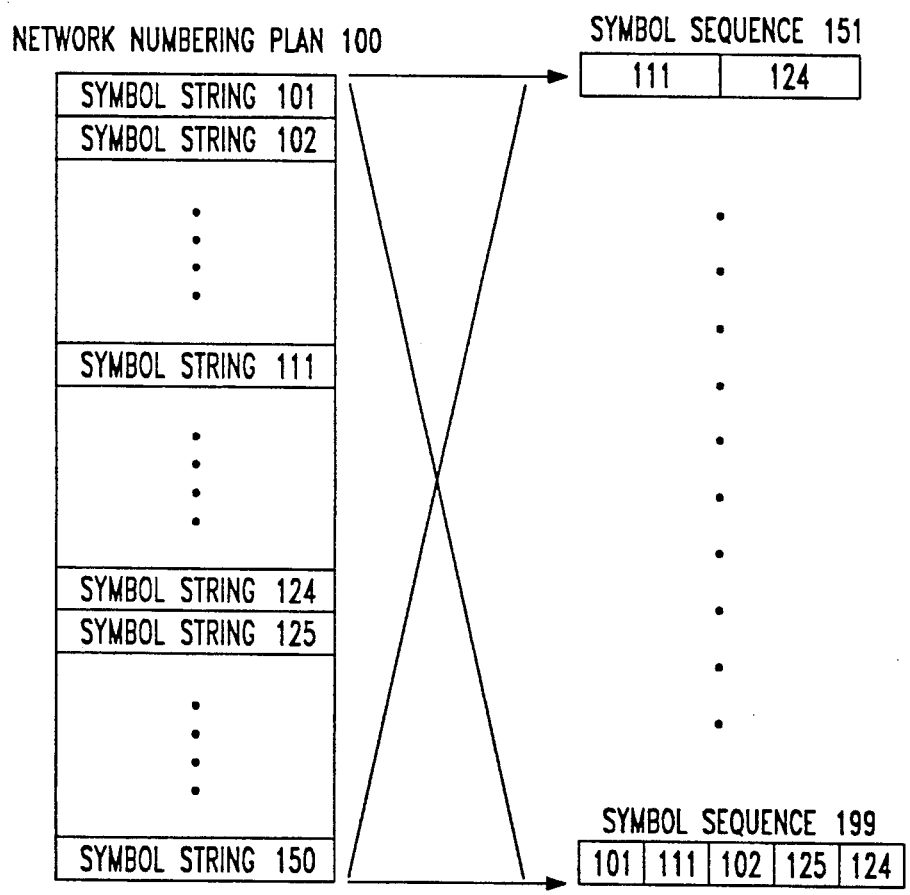
FIG. 2 is a block diagram illustrating the convention of a network numbering plan of the telephone system of FIG. 1.

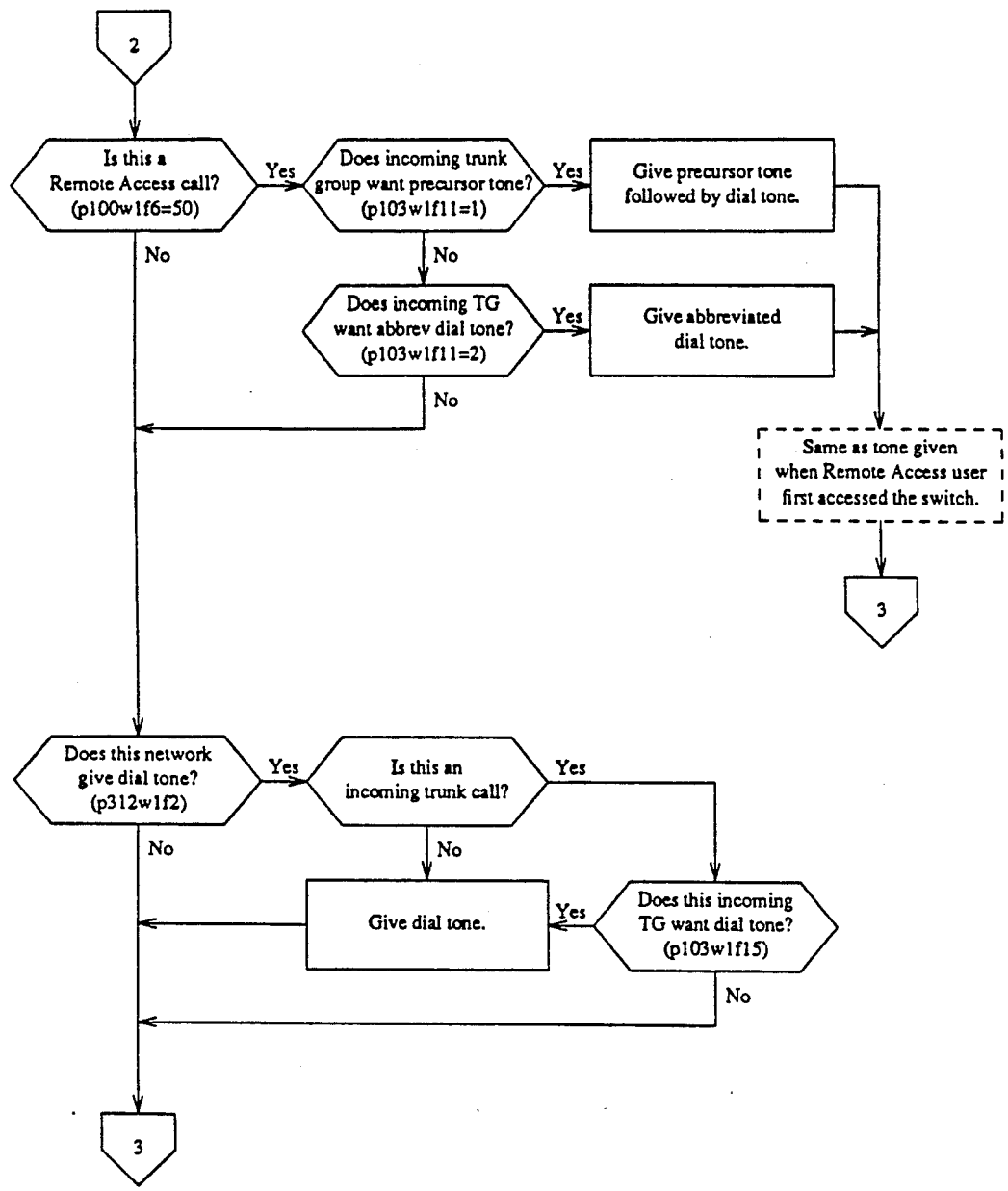
Figure 2. Add Network Call-Progress Tones

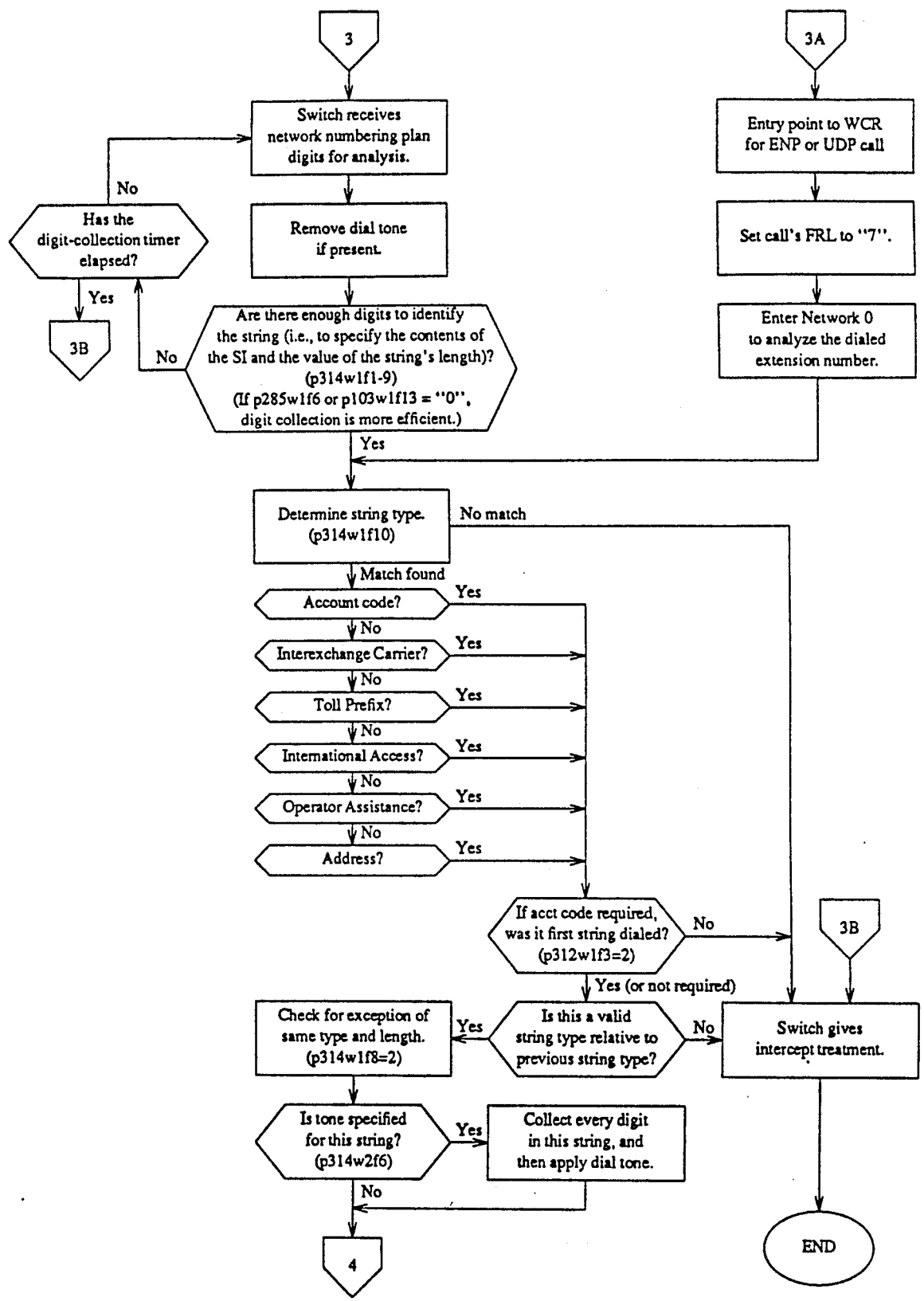
Figure 3. Network Digit Analysis — String Identification

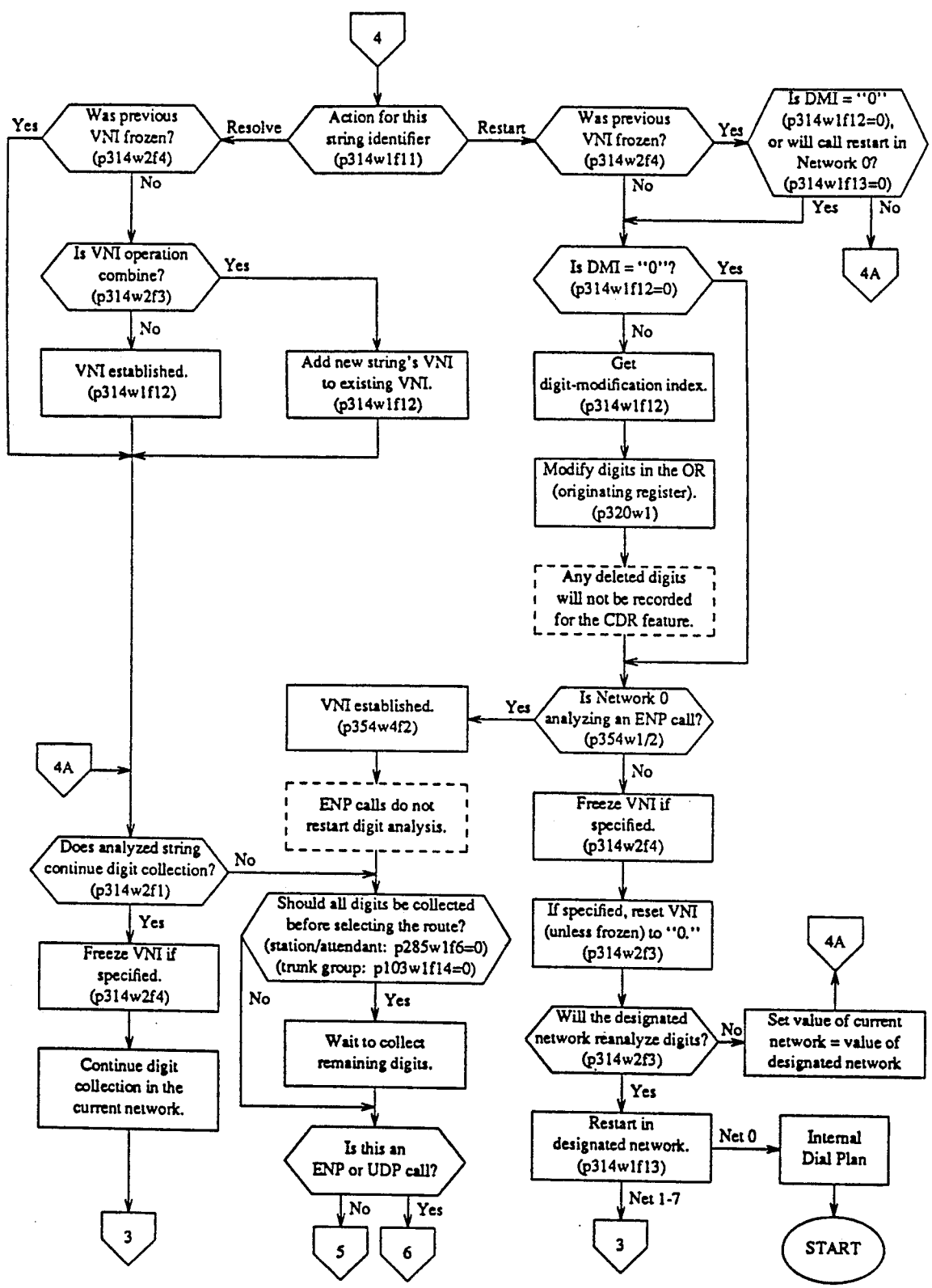
Figure 4. Network Digit Analysis — Determine VNI

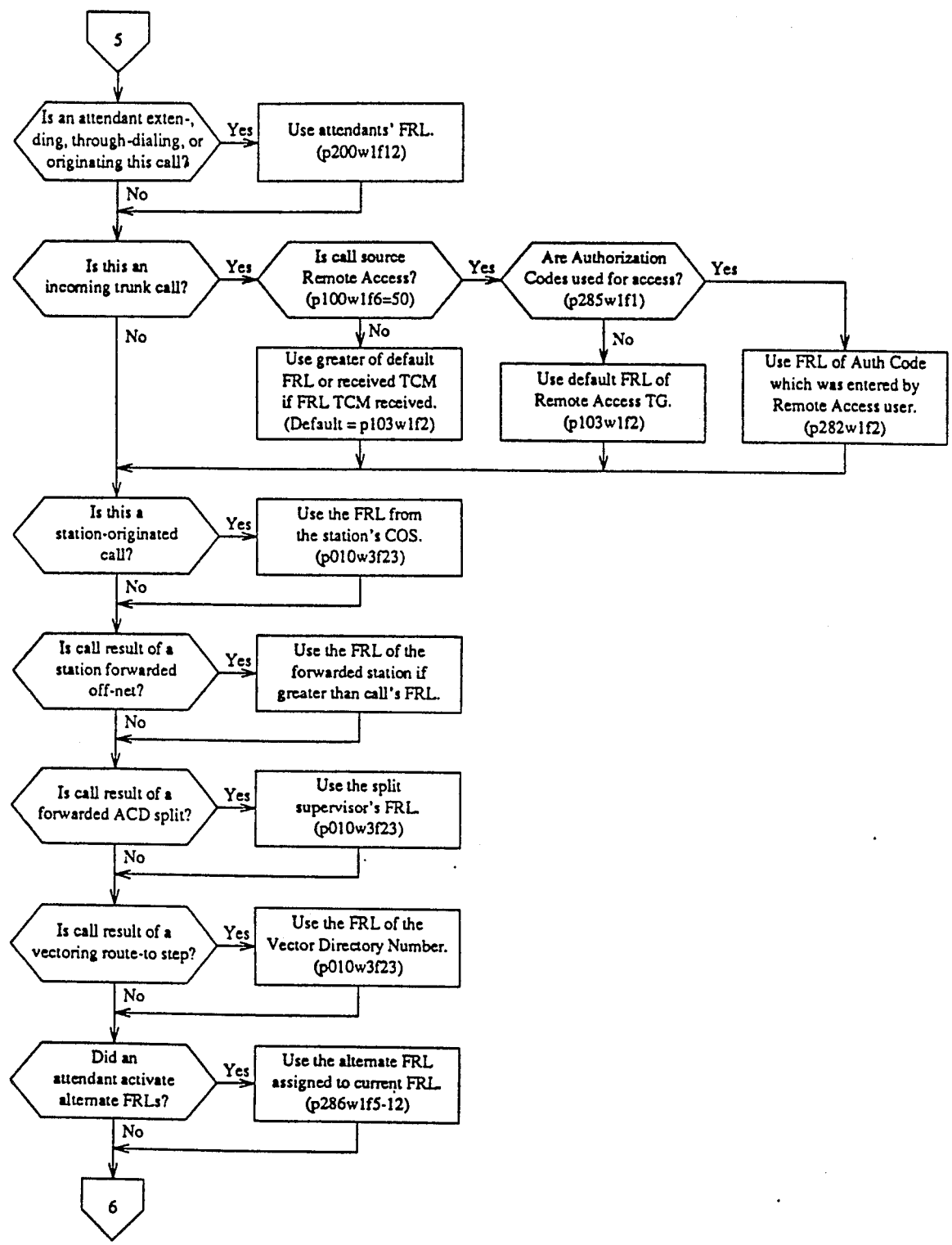
Figure 5. Determine Call's FRL

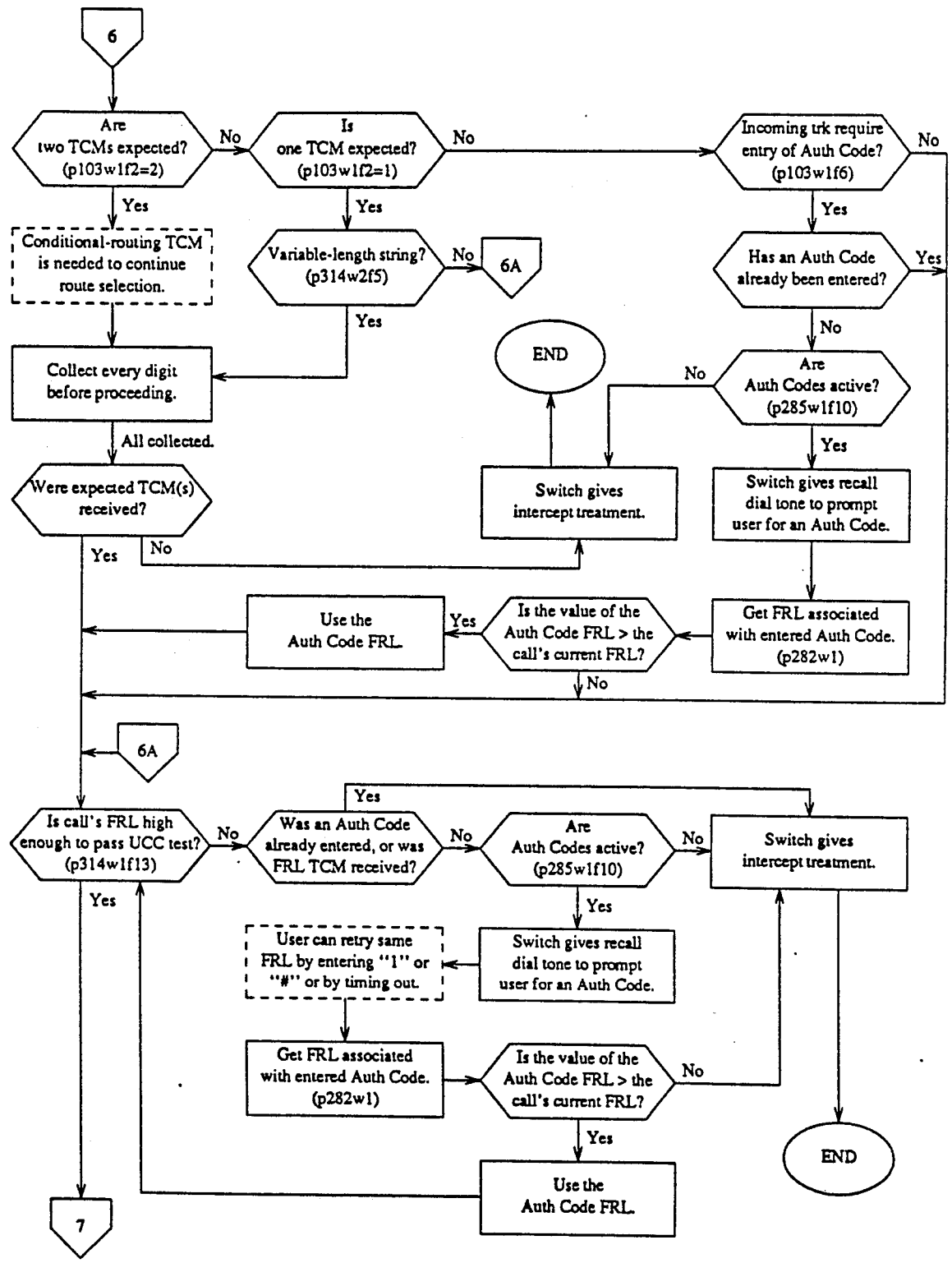
Figure 6. Check Permissions

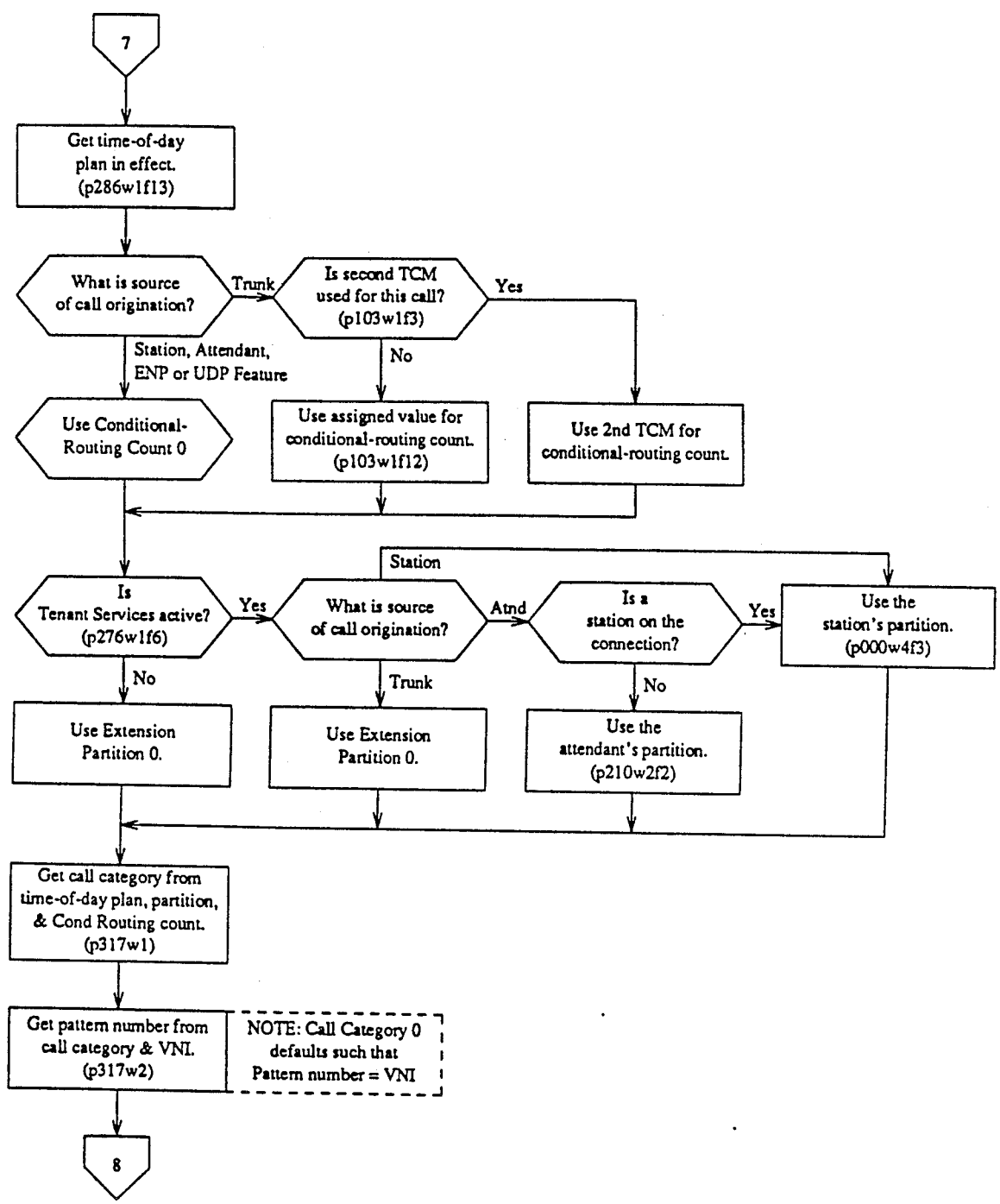
Figure 7. Pattern Selection

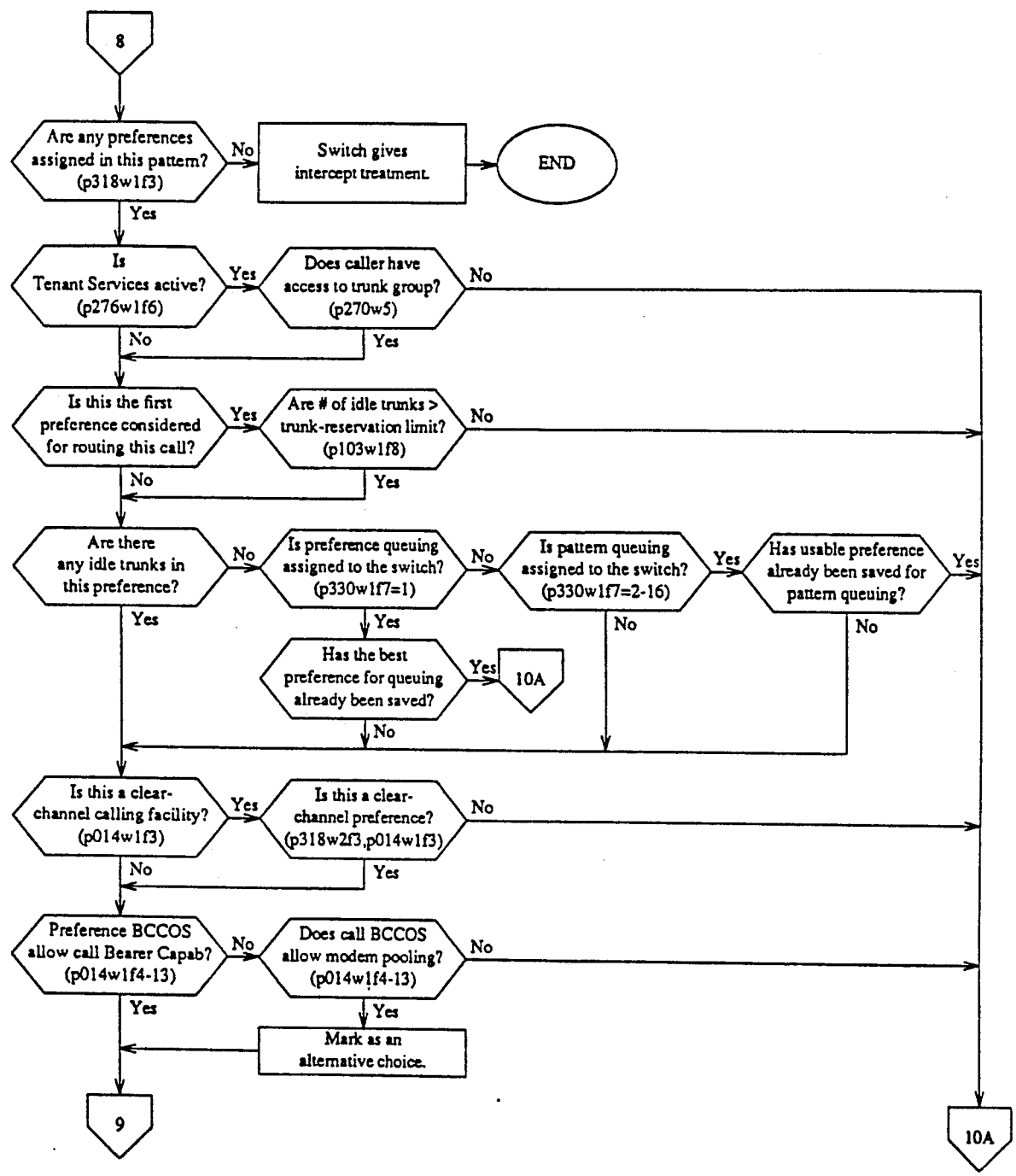
Figure 8. Preference Selection — Part 1 of 3

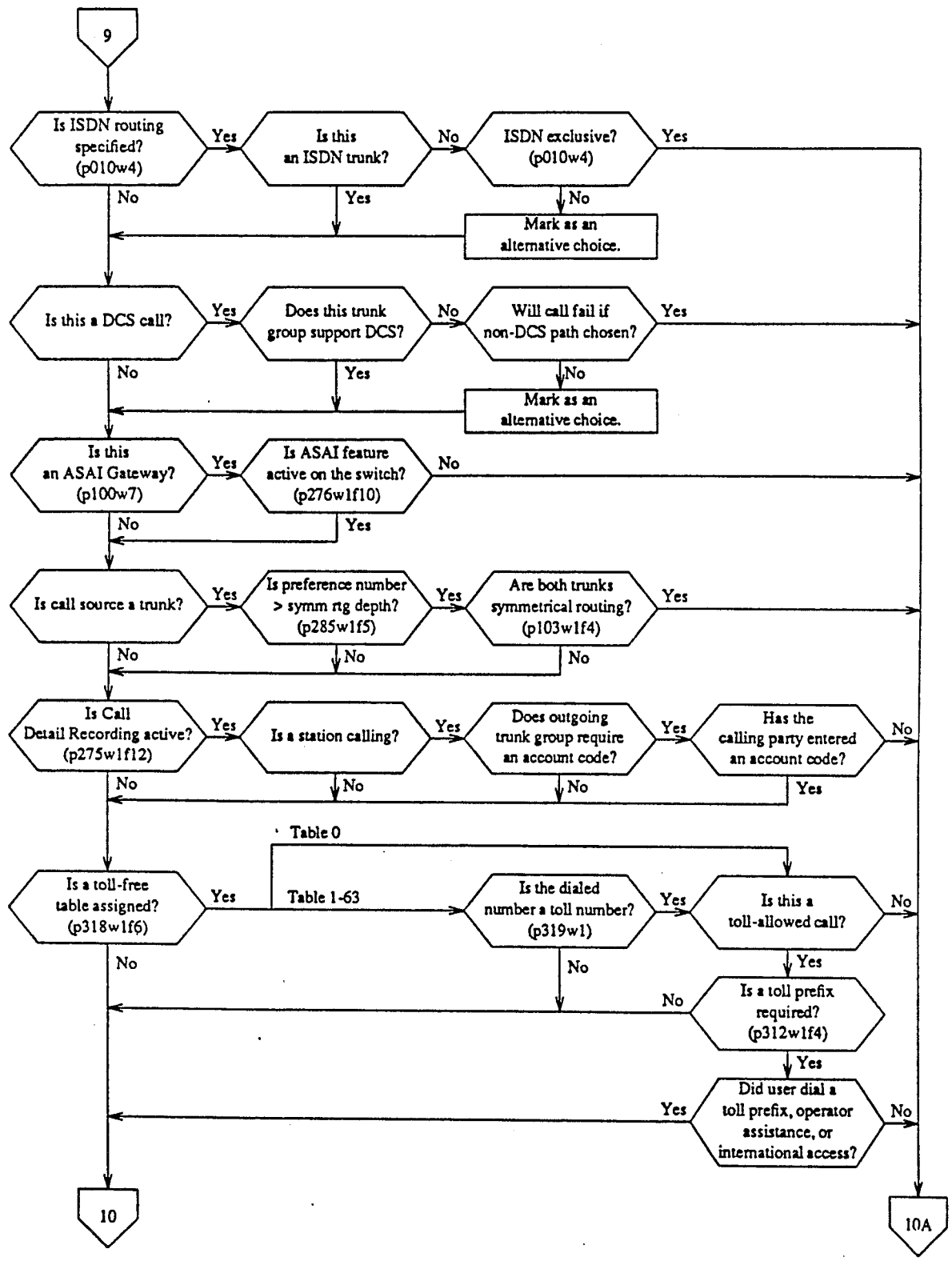
Figure 9. Preference Selection — Part 2 of 3

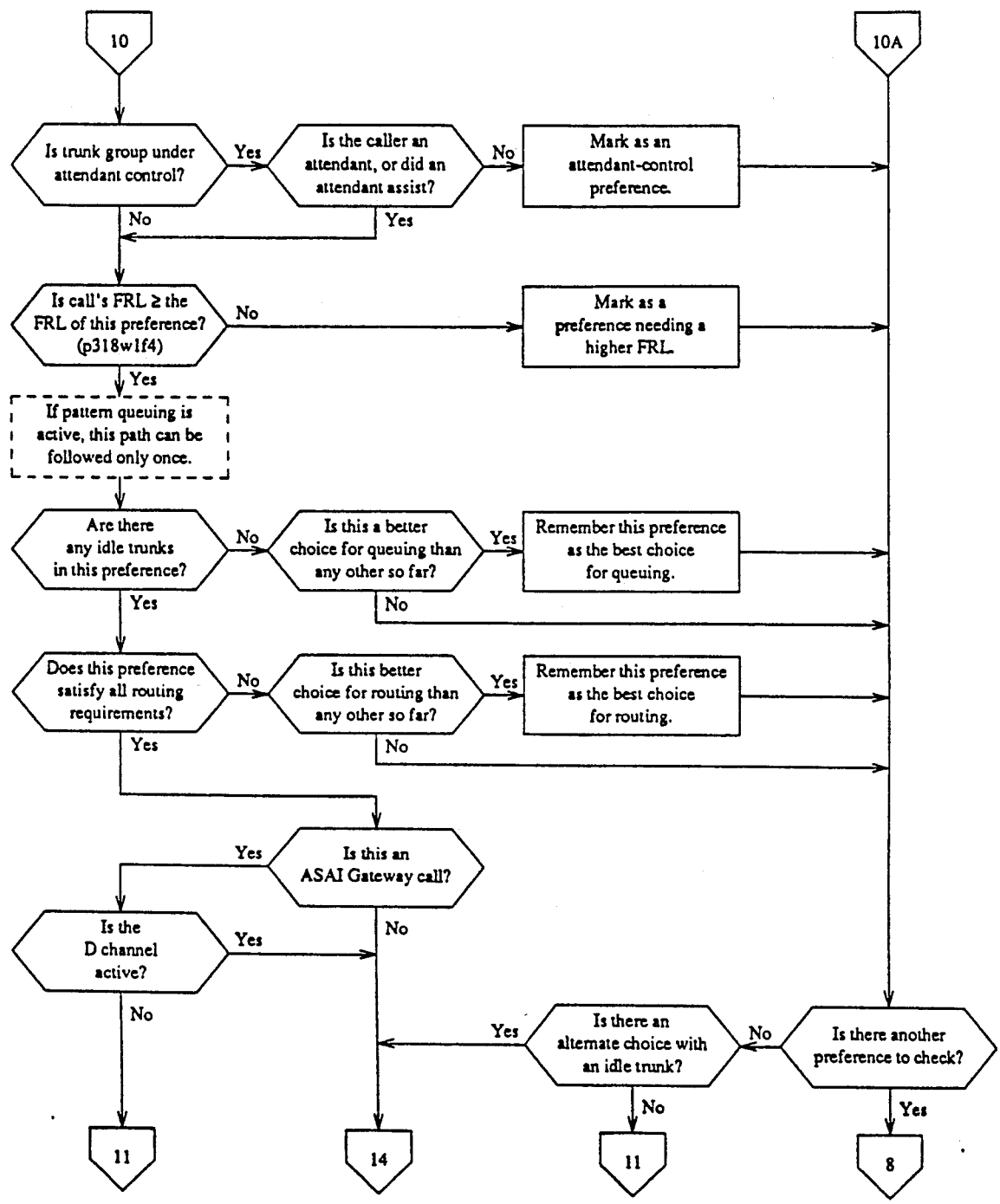
Figure 10. Preference Selection — Part 3 of 3

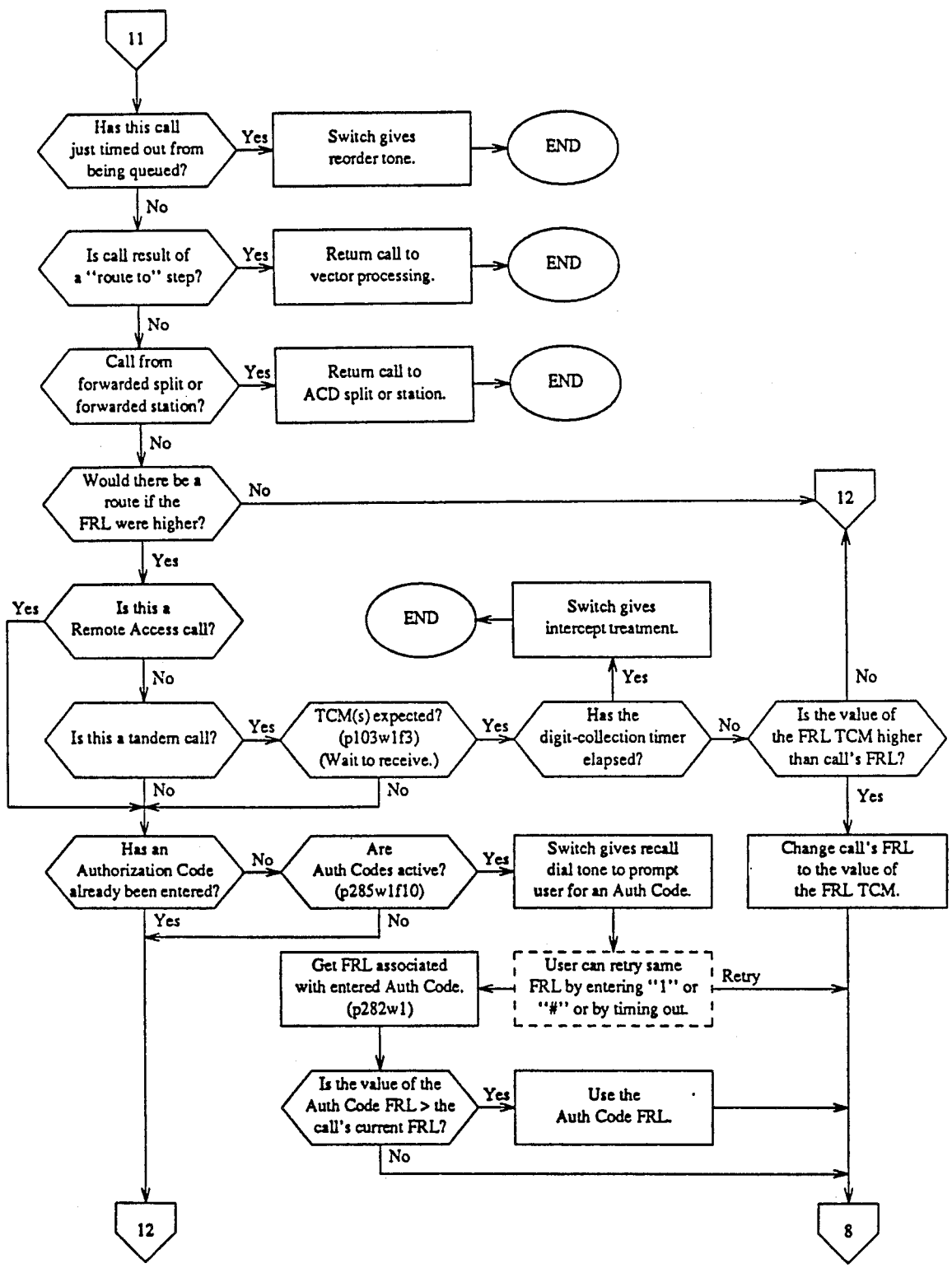
Figure 11. No Available Circuit

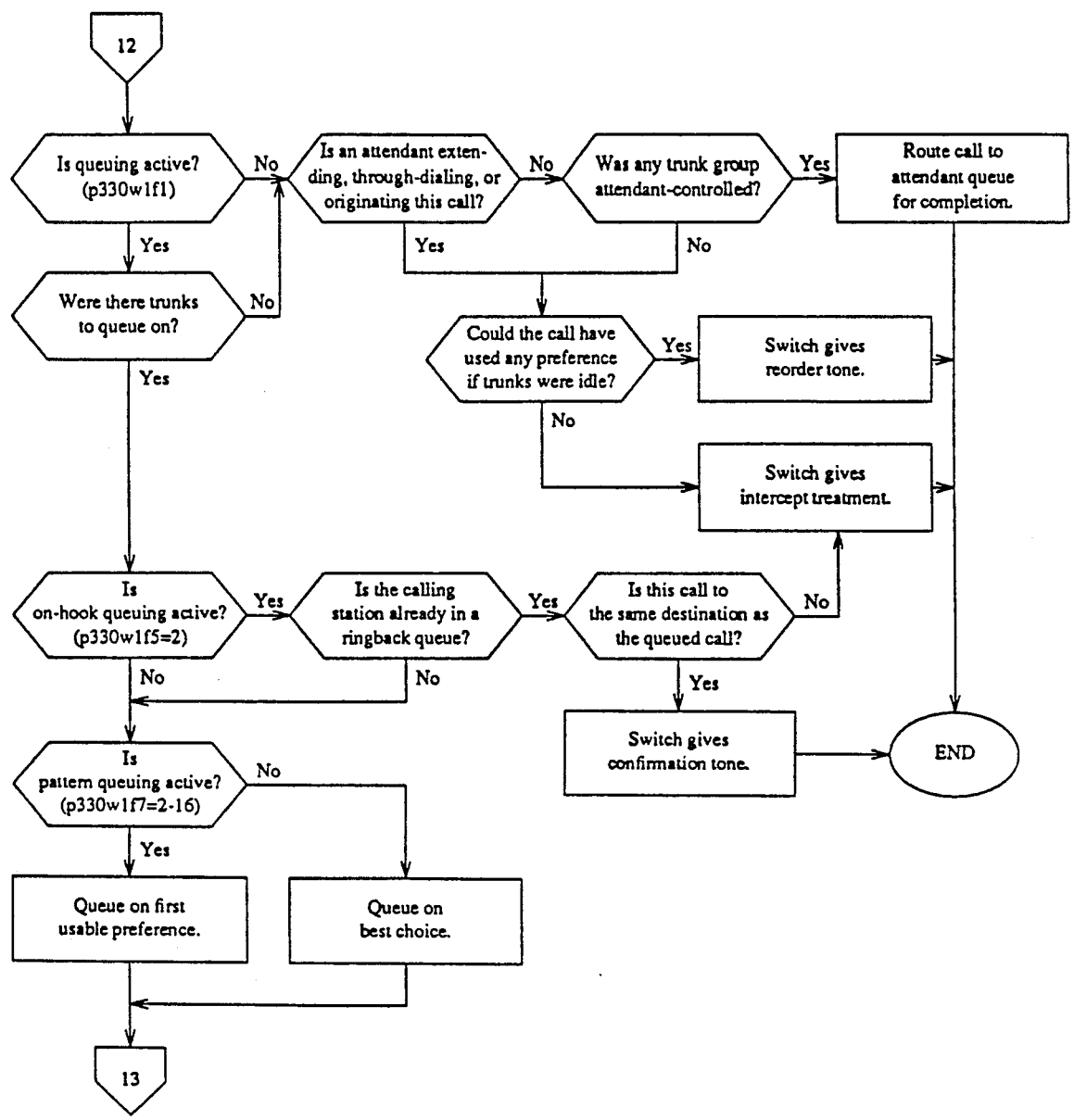
Figure 12. Queuing — Part 1 of 2

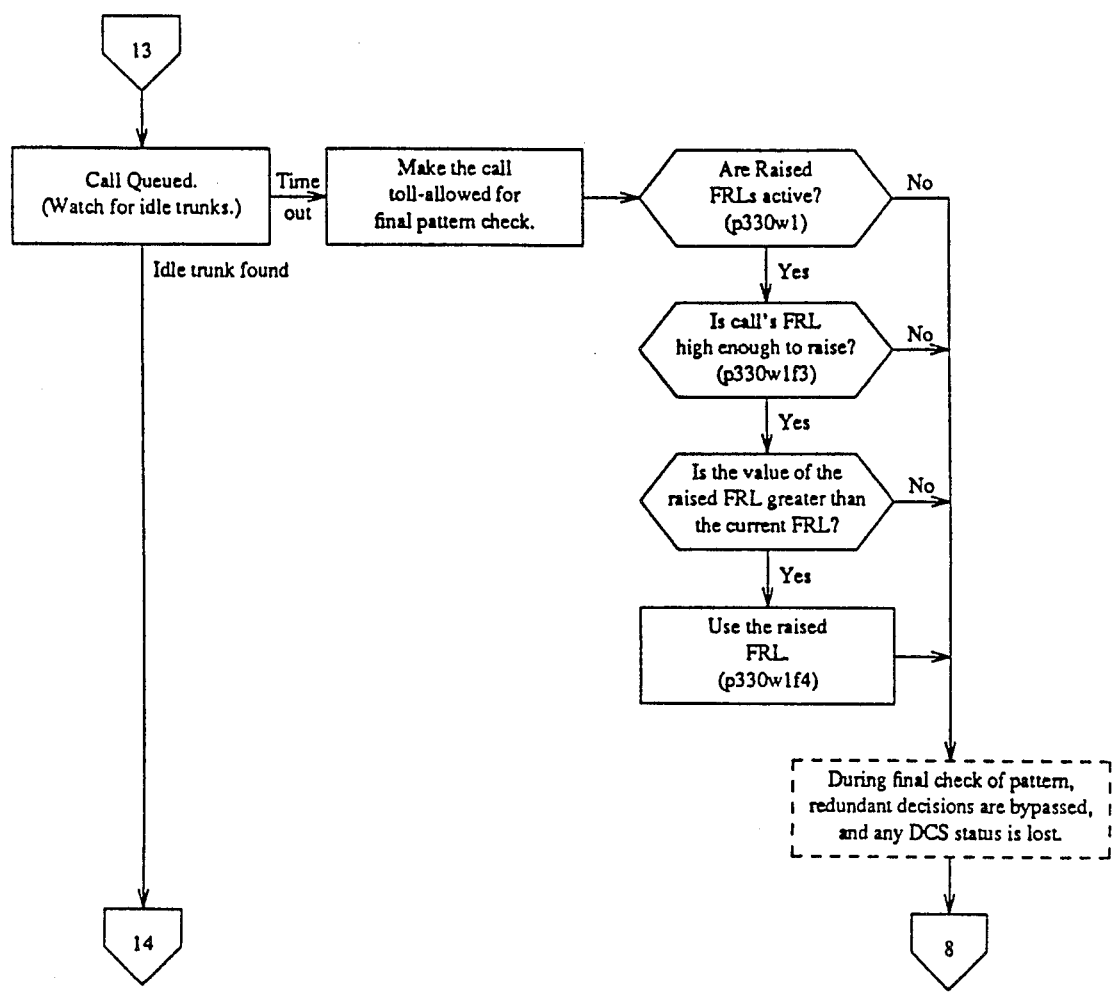
Figure 13. Queuing — Part 2 of 2

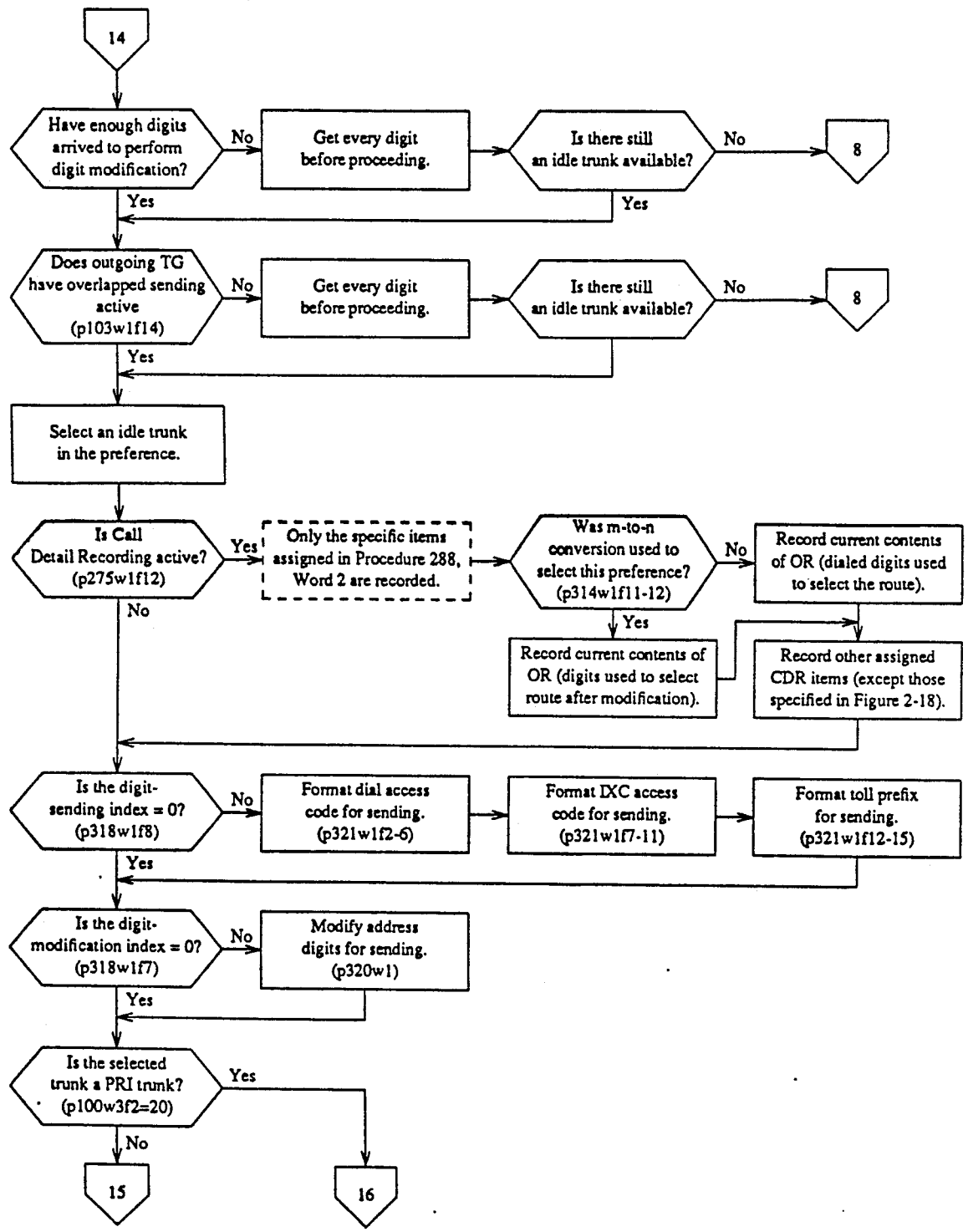
Figure 14. Digit Formatting and Modification

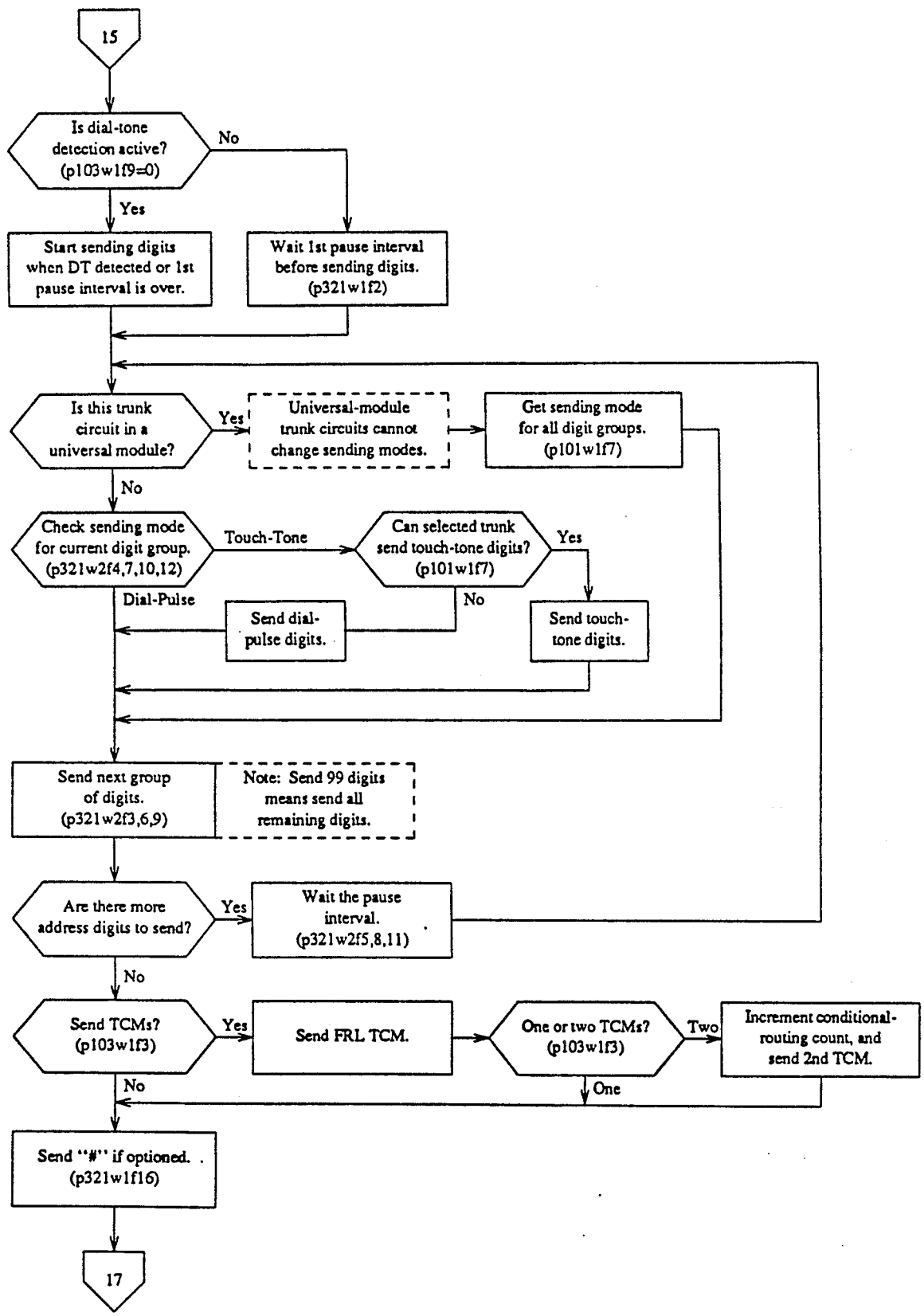
Figure 15. Digit Sending — Non-PRI

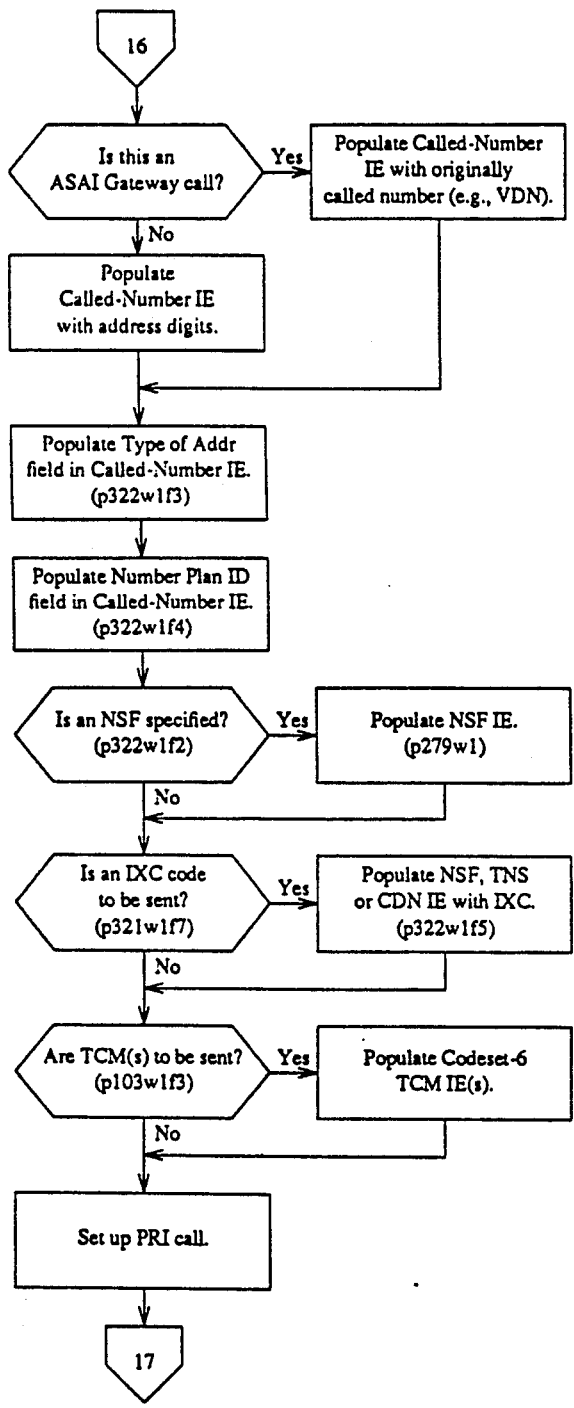
Figure 16. PRI Call Setup

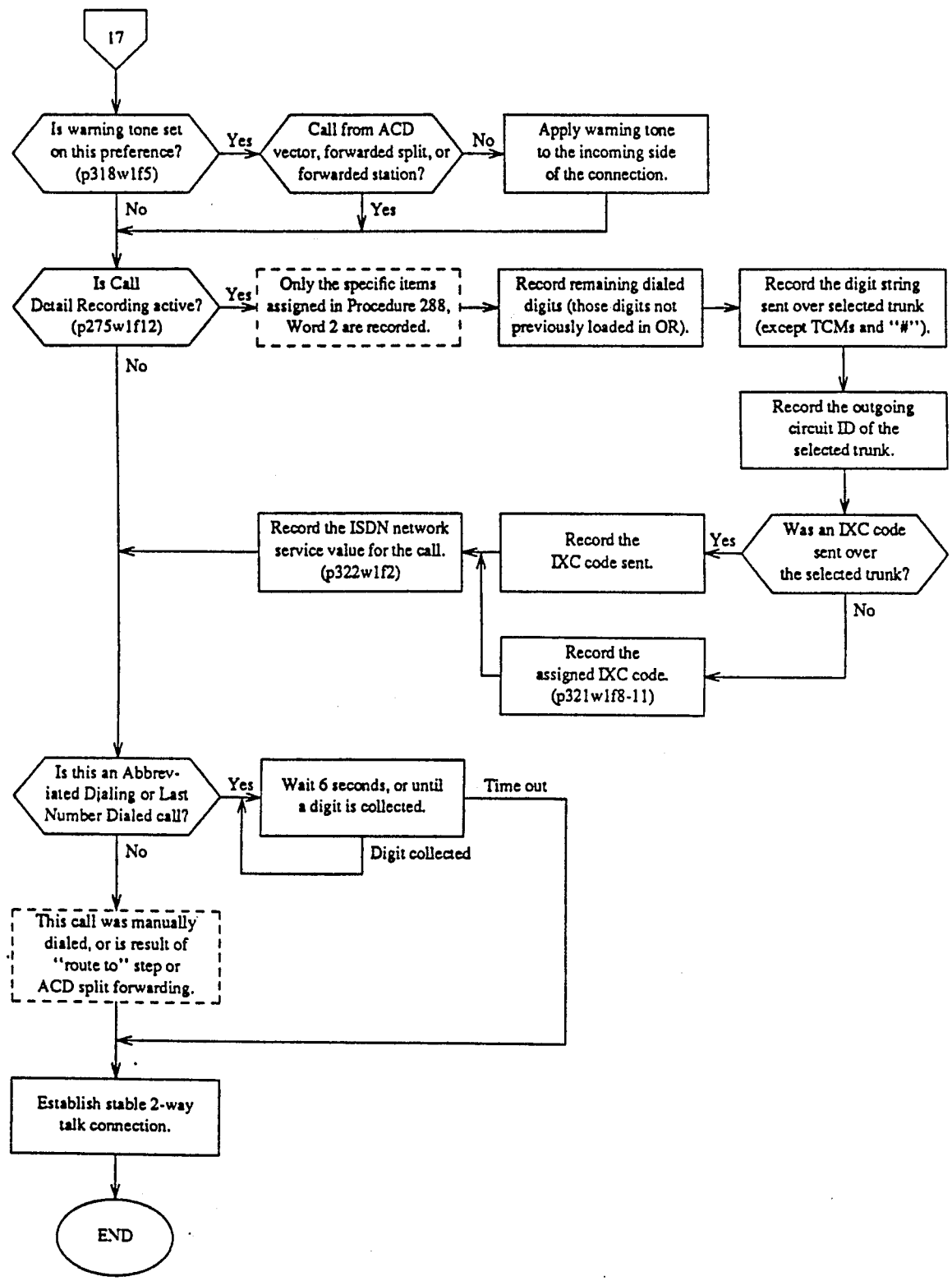
Figure 17. Establishing Stable Talk Connection

APPENDIX C
WORLD-CLASS-ROUTING SYNTAX DEFINITIONS
(In EBNF - Extended Backus Naur Form)

| represents a choice
|| an operator that concatenates (joins) two characters or strings
() are used for grouping terms Char ::= 0|1|2|3|4|5|6|7|8|9|?
    NOTE: ? means "any character"
    NOTE: Can be expanded to include {A|...|Z|*|#|.}

String ::= Char |
        String || Char

Length ::= 1|2|3|4|5|...|31

MinLength ::= Length

MaxLength ::= Length

SI ::= String(MinLength,MaxLength)
    NOTE: An "SI" is defined by a String with MinLength and MaxLength properties Type ::= 0|1|2|3|4|5|6|7
    NOTE: Use of each type is defined for each network.
         See grammar examples for specific definitions Action ::= 0|1|2
    NOTE: 0 is called "Resolve"
          1 is called "Restart"
          2 is called "Execute"

ActObj ::= 0|1|2|...|1023
    For Action = Resolve: Virtual Nodepoint Identifier
    For Action = Restart: Digit Modification Index
    For Action = Execute: Feature Module Number ActAttr ::= 0|1|2|3|4|5|6|7
    For Action = Resolve: Unauthorized Call Control Restriction Level
    For Action = Restart: Network Number in which restart is done
    For Action = Execute: Unauthorized Feature Restriction Level Cont ::= 0|1
    NOTE: 0 indicates a terminating string
          1 indicates a continuing string ReAnn ::= 0|1
    NOTE: 0 indicates that reanalysis of a string will not occur
          1 indicates that reanalysis of a string will occur Freeze ::= 0|1
    NOTE: 0 = the results of analysis could be modified
          1 = the results of analysis are "Frozen"

Combine ::= 0|1
    NOTE: 0 = the results of analysis are not modified
          1 = the results of analysis are "added" to previous results Tone ::= 0|1
    NOTE: 0 = no tone is to be applied after receipt of this string
          1 = dialtone is to be applied after receipt of this string SIDef ::= SI(Type,Action(ActObj,ActAttr),Cont,Freeze,Combine,ReAnn,Tone)
    NOTE: This is the basic syntactical definition of a valid digit
        string (i.e. the "words" that make up the language).
        Example grammars follow on the next sheets that determine
        if the "words" are used properly to construct a "sentence"
        in the language described by the grammar rules.

WCR GRAMMAR DEFINITIONS FOR North American Numbering Plan

Use of syntax codes:
    Type:
        0 =
        1 = Account Code (NOTE: although not strictly a part of the NANP, it is allowed by the switch prior to the entry of an element of the NANP, thus included in the grammar.)
        2 = IXC
        3 = Toll Prefix
        4 = International
        5 = Operator Assistance
        6 = Address
        7 =

```
ValidString1 ::= SIDef(1,...)

ValidString2 ::= SIDef(2,...) |
                 ValidString1 || SIDef(2,...)

ValidString3 ::= SIDef(3,...) |
                 ValidString1 || SIDef(3,...)

ValidString4 ::= SIDef(4,...) |
                 ValidString1 || SIDef(4,...) |
                 ValidString2 || SIDef(4,...)

ValidString5 ::= SIDef(5,...) |
                 ValidString1 || SIDef(5,...) |
                 ValidString2 || SIDef(5,...)

ValidString  ::= SIDef(6,...) |
                 ValidString1 || SIDef(6,...) |
                 ValidString2 || SIDef(6,...) |
                 ValidString3 || SIDef(6,...) |
                 ValidString4 || SIDef(6,...) |
                 ValidString5 || SIDef(6,...) |
                 ValidString  || SIDef(6,...)
```

WCR GRAMMAR DEFINITIONS FOR International Numbering Plan from North America

Use of syntax codes:
    Type:
        0 =
        1 = Account Code (NOTE: although not strictly a part of the plan, it is allowed by the switch prior to the entry of an element of the plan, thus included in the grammar.)
        2 = IXC
        3 = International (e.g. 011)
        4 = International Operator Assistance (e.g. 010 or 01)
        5 = Country Code
        6 = City Code
        7 = Office Code
        8 = Subscriber Number

```
ValidString1 ::= SIDef(1,...)

ValidString2 ::= SIDef(2,...) |
                 ValidString1 || SIDef(2,...)

ValidString3 ::= SIDef(3,...) |
                 ValidString1 || SIDef(3,...) |
                 ValidString2 || SIDef(3,...)
```

```
ValidString4 ::= SIDef(4,...) |
                 ValidString1 || SIDef(4,...) |
                 ValidString2 || SIDef(4,...)

ValidString5 ::= ValidString3 || SIDef(5,...) |
                 ValidString4 || SIDef(5,...)

ValidString6 ::= ValidString5 || SIDef(6,...)

ValidString7 ::= ValidString6 || SIDef(7,...)

ValidString  ::= ValidString7 || SIDef(8,...)
```

WCR GRAMMAR DEFINITIONS FOR
A Private Network

Use of syntax codes:
    Type:
        0 =
        1 = Account Code
        2 =
        3 =
        4 =
        5 =
        6 = Address
        7 =

```
ValidString ::= SIDef(1,...) || SIDef(6,...) |
                SIDef(6,...) |
                ValidString || SIDef(6,...)
```

WCR GRAMMAR DEFINITIONS FOR
Switch Internal Dial Plan

Use of syntax codes:
    Type:
        0 =
        1 = Feature Access Code - type 1 (no additional digits follow)
        2 = Feature Access Code - type 2 (address digits follow)
        3 = Trunk Group Access Code (DAC)
        4 = Attendant Access Code
        5 = Listed Directory Number
        6 = Equipped station
        7 = Recently disconnected station
        8 = Ported station

```
ValidString ::= SIDef(1,...)
                SIDef(2,...) || SIDef(6,...)
                SIDef(2,...) || SIDef(8,...)
                SIDef(3,...)
                SIDef(4,...)
                SIDef(5,...)
                SIDef(6,...)
                SIDef(7,...)
```

WCR GRAMMAR DEFINITIONS FOR
The Defense Switched Network

Use of syntax codes:
    Type:
        0 =
        1 = Precedence Level
        2 = Service Code
        3 = Route Code
        4 =
        5 =
        6 = Address
        7 =

```
ValidString1 ::= SIDef(1,...)
```

```
ValidString2 ::= SIDef(2,...)

ValidString3 ::= SIDef(3,...) |
                 ValidString1 || SIDef(3,...) |
                 ValidString2 || SIDef(3,...)

ValidString  ::= SIDef(6,...) |
                 ValidString1 || SIDef(6,...) |
                 ValidString2 || SIDef(6,...) |
                 ValidString3 || SIDef(6,...) |
                 ValidString  || SIDef(6,...)
```

We claim:

1. A switching system for use in a telecommunications network having a network numbering plan, wherein a caller supplies a sequence of symbols to specify treatment that is to be given to a call, said sequence including at least one symbol string that is defined for the numbering plan of the network, comprising:

administratively programmable means for specifying a caller-perceivable signal for each of a plurality of symbol strings defined for the numbering plan;

means, responsive to a call-control symbol sequence received from a caller served directly by the switching system without intermediacy of another switching system, for identifying the defined symbol strings that are included in the call-control symbol sequence; and means, coupled to the means for identifying and to the means for specifying, for sending to the caller the call-perceivable signals that are associated with the symbol stings that are included in the call-control symbol sequence.

2. A switching system for use in a telecommunications network having a network numbering plan and wherein callers supply sequences of symbols to specify treatment that is to be given to calls, each sequence comprising at least one symbol string that is defined for the numbering plan of the network, comprising:

programmable means for specifying, for each individual one of the defined symbol strings, any caller-perceivable feedback signal that corresponds to the individual symbol string, the programmable means being administratively reprogrammable to change the feedback signals that correspond to the individual ones of the symbol strings;

means for receiving from a caller served directly by the switching system without intermediacy of another switching system a call-control symbol sequence being input by the caller;

means coupled to the receiving means and responsive to receipt of symbols of the call-control symbol sequence being input by the caller, for identifying individual ones of the defined symbol strings that are included in the call-control symbol sequence; and means connected to the identifying means and to the programmable means and responsive to identification of the individual ones of the included symbol strings, for sending the feedback signal that is specified in the programmable means to correspond to the individual identified symbol string to the caller immediately following the identification of the individual included symbol string.

3. The system of claim 2 wherein:

the caller-perceivable feedback signals comprise audible tones.

4. The system of claim 2 wherein:

the programmable mean are for storing definitions of symbol strings of the numbering plan of the network, each definition including an identification of a feedback signal, if any, that corresponds to the defined symbol string; and the identifying means use the stored definitions to identify the individual ones of the defined symbol strings that are included in the call-control symbol sequence.

5. A call-processing arrangement for a call-originating telecommunications switching system of a telecommunications network having a network numbering plan and wherein callers supply sequences of symbols to specify treatment that is to be given to calls, each sequence comprising at least one symbol string that is defined for the numbering plan of the network, comprising:

programmable means for specifying, for each individual one of the defined symbol strings, any caller-perceivable feedback signal that corresponds to the individual symbol string, the programmable means being administratively reprogrammable to change the feedback signals that correspond to the individual ones of the symbol strings;

means responsive to receipt, from a caller served directly by the arrangement without intermediacy of another call-processing arrangement, of symbols of a call-control symbol sequence being input by the caller, for identifying individual ones of the defined symbol strings that are included in the call-control symbol sequence; and means connected to the identifying means and to the programmable means and responsive to identification of the individual ones of the included symbol strings, for causing the feedback signal that is specified in the programmable means to correspond to the individual identified symbol string to be sent to the caller immediately following identification of the individual included symbol string.

6. The arrangement of claim 5 wherein:

the caller-perceivable feedback signals comprise audible tones.

7. The arrangement of claim 5 wherein:

the programmable means are for storing definitions of symbol strings of the numbering plan of the network, each definition including an identification of a feedback signal, if any, that corresponds to the defined symbol string; and the identifying means use the stored definitions to identify the individual ones of the defined symbol strings that are included in the call-control symbol sequence.

8. A call-processing arrangement comprising:

data storage means for storing contents defining a syntax and a grammar of a network numbering plan that comprises a plurality of defined symbol strings, the contents that define the syntax comprising definitions of individual ones of the symbol strings of the network numbering plan, each definition including an identification of a caller-perceivable feedback signal, if any, that corresponds to the defined symbol string;

means connected to the data storage means and responsive to receipt from a caller of a string of symbols associated with a call for parsing the received symbol string by using the syntax- and grammar-defining contents of the data storage means to identify the received symbol string and to determine a meaning of the received symbol string within the network numbering plan;

means connected to the parsing means and responsive to the determined identity of the received symbol string for immediately sending to the caller the feedback signal identified in the definition of the received symbol string; and means connected to the data storage means and to the parsing means and responsive to the determined meaning of the received symbol string for specifying a treatment to be given to the call, by using the determined meaning and the syntax- and grammar-defining contents of the data storage means.

9. The arrangement of claim 8 wherein:

the parsing means are responsive to receipt from a caller of a sequence of symbols associated with a call, for parsing the received sequence by using the contents of the data storage means, to identify in the sequence at least one symbol string of the network numbering plan and to determine a meaning within the network numbering plan of each said identified symbol string;

the sending means are responsive to the determined identity of each individual received symbol string for sending to the caller the feedback signal identified in the definition of the received individual symbol string, immediately upon receipt and identification of the individual symbol string; and the treatment-specifying means are responsive to the determined meaning of the at least one identified symbol string for specifying a treatment to be given to the call, by using the determined meaning of the at least one identified symbol string and the contents of the data storage means.

10. The arrangement of claim 8 wherein:

the caller-perceivable feedback signals comprise audible tones.

11. The arrangement of claim 8 wherein:

the data storage means are administratively reprogrammable to change the feedback signals that correspond to the defined symbol strings.

12. A method of giving feedback to callers in a telecommunications network having a numbering plan and wherein callers supply sequences of symbols to specify treatment that is to be given to calls, each sequence comprising at least on symbol string that is defined for the numbering plan of the network, comprising the steps of:

receiving directly from a caller, without intermediacy of either a call-processing arrangement or a switching system, symbols of a call-control symbol sequence being input by the caller;

in response to the receiving, identifying individual ones of the defined symbol strings that are included in the call-control symbol sequence;

in response to the identification of individual ones of the included symbol strings, determining from contents of an administratively-reprogrammable programmed arrangement that specifies, for each individual one of the defined symbol strings, any caller-perceivable feedback signal that presently corresponds to the individual symbol string, the feedback signal that is specified in the programmable means to presently correspond to the individual identified symbol string; and in response to the determination, sending to the caller the determined feedback signal immediately following the identification of the individual included symbol string.

13. The method of claim 12 wherein:

the caller-perceivable feedback signals comprise audible tones.

14. The method of claim 12 wherein:

the step of identifying comprises the step of using contents of an arrangement that stores defines of symbol strings of the numbering plan of the network, each definition including an identification of a feedback signal, if any, that corresponds to the defined symbol string, to identify the individual ones of the defined symbol strings that are included in the call-control symbol sequence; and the step of determining comprises the step of using the stored definitions of the symbol strings of the numbering plan to determine the feedback signal that is presently specified to correspond to the individual identified symbol string.

15. A call-processing method comprising the steps of:

receiving from a caller a string of symbols associated with a call;

in response to the receipt, parsing the received symbol string by using stored definitions of a syntax and a grammar of a network numbering plan, to identify the received symbol string and to determine a meaning of the received symbol string within the network numbering plan;

in response to the identification, immediately sending to the caller a caller-perceivable feedback signal, if any, that is identified in the definition of the received symbol string; and in response to the determination of the meaning of the received symbol string, specifying a treatment to be given to the call by using the determined meaning of the symbol string and the stored definitions of the syntax and the grammar of the network numbering plan.

16. The method of claim 15 wherein:

the step of receiving comprises the step of receiving from the caller a sequence of symbols associated with the call;

step of parsing comprises the step of in response to the receipt, parsing the received sequence by using the stored definitions to identify in the sequence at least one symbol string of the network numbering plan and to determine a meaning within the network numbering plan of each said identified symbol string;

the step of sending comprises the step of in response to the identification of each individual received symbol string, sending to the caller the feedback signal, if any, that is identified in the definition of the individual received symbol string, immediately upon identification of the individual received symbol string; and the step of specifying a treatment comprises the step of in response to the determined meaning of the at least one identified symbol string, specifying a treatment to be given to the call by using the determined meaning of the at least one identified symbol string and the stored definitions.

17. The method of claim 15 wherein:
the caller-perceivable feedback signals comprise audible tones.

18. The method of claim 15 further comprising the step of:
administratively reprogramming the stored definitions of the syntax of the network numbering plan, to change the feedback signals that correspond to the defined symbol strings.

* * * * *